(12) United States Patent
Bindon

(10) Patent No.: US 9,684,426 B2
(45) Date of Patent: Jun. 20, 2017

(54) NON-TRANSITORY COMPUTER-READABLE MEDIUM ENCODED WITH A 3D GRAPHICAL USER INTERFACE PROGRAM AND A COMPUTING DEVICE FOR OPERATING THE SAME

(75) Inventor: Andrew Bindon, Dorchester (GB)

(73) Assignee: Gooisoft Ltd., Surrey (GB)

( * ) Notice: Subject to any disclaimer, the term of this patent is extended or adjusted under 35 U.S.C. 154(b) by 334 days.

(21) Appl. No.: 13/235,011

(22) Filed: Sep. 16, 2011

(65) Prior Publication Data
US 2013/0127850 A1    May 23, 2013

(30) Foreign Application Priority Data

Sep. 6, 2011 (GB) .................................. 1115369.9

(51) Int. Cl.
| | | |
|---|---|---|
| G06T 15/00 | (2011.01) | |
| G06F 3/0481 | (2013.01) | |
| G06T 19/20 | (2011.01) | |

(52) U.S. Cl.
CPC .......... *G06F 3/04815* (2013.01); *G06T 19/20* (2013.01); *G06F 2203/04802* (2013.01); *G06T 2200/24* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 5,678,015 A | 10/1997 | Goh | |
| 5,861,889 A * | 1/1999 | Wallace et al. | ............... 345/619 |
| 7,013,435 B2 | 3/2006 | Gallo et al. | |
| 2001/0028369 A1 | 10/2001 | Gallo et al. | |
| 2004/0091143 A1* | 5/2004 | Hu | ......... G06T 7/0085 382/154 |
| 2007/0070066 A1* | 3/2007 | Bakhash | ............. G06F 3/04815 345/419 |
| 2007/0164989 A1* | 7/2007 | Rochford | .............. G06F 3/0482 345/156 |
| 2007/0183685 A1* | 8/2007 | Wada | ........................ G06K 9/32 382/285 |
| 2008/0005702 A1* | 1/2008 | Skourup et al. | ............... 715/848 |
| 2010/0107187 A1* | 4/2010 | Krantz et al. | ................... 725/32 |
| 2011/0153602 A1* | 6/2011 | Kiddle | .............. G06F 17/30029 707/731 |
| 2012/0056900 A1* | 3/2012 | Park | .................... G06F 3/04815 345/653 |

FOREIGN PATENT DOCUMENTS

WO        2010018126 A1    2/2010

* cited by examiner

*Primary Examiner* — Said Broome
(74) *Attorney, Agent, or Firm* — Studebaker & Brackett PC

(57) ABSTRACT

A user interface for a computing device, the interface comprising means for defining a coordinate system of a 3D frame (1), the 3D frame (1) being rotatable within a 3D environment of the user interface; and a plurality of 3D elements (2), each 3D element (2) being locatable at a position relative to the coordinate system for rotation with the 3D frame (1) and comprising a graphical indicator for identifying the 3D element (2).

21 Claims, 27 Drawing Sheets

(a) Perspective (b) Side profile (c) Plan view

NON-TRANSITORY COMPUTER-READABLE MEDIUM ENCODED WITH A 3D GRAPHICAL USER INTERFACE PROGRAM AND A COMPUTING DEVICE FOR OPERATING THE SAME

The present invention concerns a graphical user interface (GUI) for a computing device and a computing device operating the same. In particular, the present invention concerns a three dimensional (3D) spatial user interface for use on a computing device, such as a personal computer, smart-phone, tablet, or gaming device.

In this connection, people continue to use computing devices more and more in their daily lives. As hardware performance increases and processing costs decrease, there has been a rapid expansion in the functionality offered by computing devices, with people using them not only for work related tasks, but also for leisure, lifestyle, and social functions. As an example, modern computers and smart-phones are often used not only for work emails and document production, but also to store and access a user=s music, photo, and film collections, as well as for internet browsing and gaming. This has led to a dramatic and continued increase in the number icons, folders, and subfolders used to organise this functionality within the computing environment.

Traditionally, computer user interfaces have attempted to mirror traditional real world situations. For example, conventional computer desktops screens are generally intended to mirror an office desk, with icons designating folders of documents which could be opened on the desk in _windows_. However, with the expansion of functionality discussed above, such desktops have become more and more cluttered. This is particularly true for portable computing devices. For example, some modern computers and smart-phones allow users to switch between different desktop screen setups, which contain different icons, depending on whether they are performing work or leisure functions. Another conventional solution is to provide greater numbers of sub-folders in order to categorise functions and data. However, whilst these solutions of separating or categorising different functions or data allow users to readily access similar functions and data, this often does not fit in reality with how modern users use such computing devices. For example, users often multi-task applications performing different functions. For instance, a user may wish to play music from their music collection while working on a word processing document and switching between this and various internet web pages. Performing these types of operations using conventional GUIs can quickly result in very cluttered desktop with a large number of different windows being opened because each different function or data file is typically contained in a different folder or on a different desktop screen. As such, a user is often left unaware as to which applications are currently running. This can lead to applications or tasks running unnecessarily in the background, leading to increased processing overheads and decreased performance.

A further limitation with conventional GUIs is that they often do not easily allow data items associated with different applications to be linked together or associated with one another within the GUI. For example, a user may have a text document which is relevant to a number of web pages and photographs stored on their computer. Typically, the text document will often be stored in their ADocuments@ folder, the photographs in their APictures@ folder, and their web pages in the ABookmarks@ of their web browser. To launch all three data types, a user must then separately open them from their respective folders or sub-folders, as well as launch their web browser and find the relevant bookmarks. The user themselves therefore is required to remember where each of these related documents are stored.

The above issues are exacerbated with the onset of cloud computing functionality. As the storage of a user's personal data diversifies, the facility of allowing the user to visualise associations between different data items/data sources is becoming ever more important.

A complication with devising a solution to the above issues is the need to maintain an optimum user experience. That is, increasing the complexity of a GUI to allow more functions often leads to a less intuitive interface and may also necessitate greater processing and hardware requirements. For example, complex GUIs with multiple desktop screens and complex file structures will often be slower and more difficult to use and navigate. At the same time, such complex GUIs may have more complex coding and greater memory requirements. Not only does this result in an unsatisfactory user experience, but it also can increase memory requirements and demand on the central processing unit (CPU). This can slow the computer's ability to run other applications. This is particularly detrimental for portable devices which often have more limited CPU processing capabilities.

Accordingly the present invention seeks to overcome the above problems with the prior art.

According to an aspect of the present invention, there is provided a user interface for a computing device, the interface comprising: means for defining a coordinate system of a 3D frame, the a 3D frame being rotatable within a 3D environment of the user interface; and a plurality of 3D elements, each 3D element being locatable at a position relative to the coordinate system for rotation with the 3D frame and comprising a graphical indicator for identifying the 3D element.

In this way, the 3D elements or objects form place holders or icons for information or data within the 3D environment. For example, they may contain text or graphics, or provide links to a stored data file, application, or a web page, allowing the user to access the file, application or web page by selecting the relevant 3D element. The 3D elements may be assigned to positions on or adjacent (e.g. hovering above) the surface of the 3D frame. This effectively pins the 3D elements to the frame, so that the user is able to group different types of data items together and visualise their entire computing environment simply by rotating the 3D frame. This allows a user to easily see connections or associations between different elements or groups of elements and hence different types of data. Moreover, the 3D frame provides a relatively larger surface area over which such place holders or icons may be placed, as compared to conventional two dimensional desktop type GUIs. The user can, nevertheless, easily view or access any of the place holders or icons simply by rotating the 3D frame.

An important advantage of the present invention is that it capitalises on the processing abilities offered by graphics processing units (GPUs) of modern computer processing arrangements. Conventional GUI rely largely upon CPU based processing. The present invention, however, makes use of the hardware based 3D graphics acceleration offered by GPUs. That is, the 3D environment of the GUI comprises a 3D frame and 3D elements which may be formed of basic 3D components such as spheres and cones. The formation, arrangement, and manipulation of such 3D components in the 3D environment can be expressed in relatively basic coordinates and algorithms, and their subsequent rendering makes use of standard functions of the GPUs graphics pipeline. As such, a visually intuitive GUI environment is provided which allows complex arrangements of data, but at minimal computational complexity.

Preferably, the coordinate system is defined by an origin of the 3D frame. This simplifies the definition of the 3D elements relative to the 3D frame, thereby simplifying the translations of vectors and rendering during processing.

Preferably, the interface further comprises means for displaying a surface of the 3D frame, the 3D elements being locatable on or relative to a position on the 3D frame surface based on the coordinate system. This allows a user to more easily visualise where 3D elements are being placed within the 3D environment.

Preferably, each of the plurality of 3D elements is an icon or a data placeholder.

Preferably, the plurality of 3D elements are moveably locatable relative to the coordinate system. As such, the 3D elements may be moved to different positions on the 3D frame as required by the user.

Preferably, the 3D frame and/or the plurality of 3D elements are basic geometric shapes. This simplifies the definition of the 3D elements relative to the 3D frame, and thereby the computation and rendering of the elements within the 3D environment. This thereby minimises the processing burden on the GUI.

Preferably, the plurality of 3D elements comprises a sphere or a cone.

Preferably the cone has a circular base. In this way, not only is the cone is easy to define algorithmically, but the cone shape is able to lie flat over curved frame surfaces and form quazi-hexagonal arrangements when grouped together. This allows for compact arrangements of groups of 3D elements.

Preferably, the cone has a height to radius ratio of 1:15-30. In this way, the cone has a relatively flattened shape, thereby avoiding excessive warping of a graphical indicator mapped to its surface.

Preferably, the cone=s base faces towards the origin of the 3D frame. In this way, the base can lie flat over the 3D frame.

Preferably, the 3D frame is a sphere. In this way, the spherical surface of the 3D frame lends itself to free rotation in any axis. As such, the 3D elements can be placed at any point on the sphere, with no point having a greater importance than any other. At the same time, locations on the sphere can be easily defined using the coordinate system.

Preferably, the 3D frame surface has variable transparency. This allows a user to see 3D elements which have been placed at positions on the rear of the frame while viewing the front.

Preferably, each 3D element is automatically rotatable about its own axis when moved within the 3D environment such that its graphical indicator remains upright from in the point of view of a user. This allows a user to easily identify what each 3D element relates to, regardless of the current orientation of the 3D frame.

Preferably, the plurality of 3D elements are locateable at a fixed distance above the 3D frame surface.

Preferably, the user interface further comprises means for applying an automatic object spacing algorithm for controlling the spacing of 3D elements which are within a predetermined distance of each other. This allows the 3D elements to automatically arrange themselves using standardised rules.

Preferably, automatic object spacing algorithm applies iterative distancing rules. In this way, the present invention can make use of a game loop process to control the automatic arrangement of the 3D elements. Each iteration may be prompted, for example, using display frames of the GPU. This allows the 3D elements to exhibit emergent behavior, naturally forming quasi-hexagonal arrangements when grouped together, without specific user input.

Preferably, the automatic object spacing algorithm is disabled after attempting to space two or more 3D elements for more than a predetermined number of iterations. This avoids excessive processing burden if groups of 3D elements are unable to settle into a quasi-hexagonal arrangement.

Preferably, the automatic object spacing algorithm moves elements which are within a predetermined distance of each other such that their centres have a separation distance of 2×radius of the 3D element×cos (60 degrees).

Preferably, groups of 3D elements within a predetermined distance of each other are selectable as a group. In this way, when two or more 3D elements are each within a predetermined distance of another of the 3D elements (e.g. touching) they are automatically designated as a group. This allows these 3D elements to be selected and interacted with as a group by the user. This simplifies and automates associations between groups of 3D elements.

Preferably, the user interface further comprises a memory for storing a record of 3D elements grouping. This allows a user to record how associations between 3D elements have changed and developed.

Preferably, the group is selectable by selecting a boundary circle, the boundary circle defining a circular space whose area covers a subset of all the 3D elements included in the given group. This provides a means by which groups of 3D elements can be identified and selected as a group.

Preferably, the user interface further comprises means for applying an automatic group spacing algorithm for controlling the spacing of groups of 3D elements which are within a predetermined distance of each other. This allows for the automatic arrangement of groups on the frame.

Preferably, the automatic group spacing algorithm applies iterative distancing rules. In this way, the present invention can make use of a game loop process to control the automatic arrangement of the 3D elements.

Preferably, a first group of the 3D elements repulses a second group of the 3D elements when a centre of the second groups=boundary circle is closer than 2.1×radius of the first group=s boundary circle.

Preferably, a group graphical indicator is assignable to a selectable group. In this way, a group of associated 3D elements can easily be identified. For example, a text graphical indicator may be assigned to a selectable group.

Preferably, the user interface further comprises a memory for storing categorisation data for each of the plurality of 3D elements. In this way, different categories of 3D elements can easily be identified and searched.

Preferably, the user interface further comprises user control means for allowing a user to adjust the size of at least one of the plurality of 3D elements. In this way, the relative importance of different 3D elements can be visually represented by adjusting their size.

Preferably, the user interface further comprises linking elements for visually linking between 3D elements.

Preferably, the user interface further comprises a user input means for controlling the rotation of the 3D frame.

Preferably, the user interface further comprises a display for displaying the 3D environment.

Preferably, the graphical indicator of each 3D element is applied to its surface as a texture. In this way, standardised processes of the 3D graphics pipeline can be used to render each of the 3D elements. This improves processing efficiency.

Preferably, the user interface further comprises a memory for storing the locations of the 3D elements relative to the coordinate system at intervals in time. In this way, a user is able to easily revert to previous arrangements of 3D elements and visualise how associations between 3D elements has changed over time.

According to a further aspect of the present invention, there is provided a method of implementing a user interface for a computing device, the method comprising: providing data for defining a coordinate system of a 3D frame, the 3D frame being rotatable within a 3D environment of the user interface; and providing data for displaying a plurality of 3D elements, each 3D element being locatable at a position relative to the coordinate system for rotation with the 3D frame and comprising a graphical indicator for identifying the 3D element.

Preferably, the data for defining the coordinate system and the data for displaying a plurality of 3D elements is provided to a graphics processing unit of the computing device for rendering an image.

According to a further aspect of the present invention, there is provided a computing device comprising: a module for defining a coordinate system of a 3D frame, the 3D frame being rotatable within a 3D environment of the user interface; a module for defining a plurality of 3D elements within the 3D environment, each 3D element being locatable at a fixed position relative to the coordinate system for rotation with the 3D frame and comprising a graphical indicator for identifying the 3D element; and a graphics processing unit for rendering the 3D environment and the 3D elements for display on a display screen.

According to a further aspect of the present invention, there is provided a user interface for a computing device, the interface comprising: a 3D frame having a surface and being rotatable within a 3D environment; and a plurality of 3D elements, each 3D element being assignable to position on or adjacent the surface of the 3D frame and being rotatable therewith within the 3D environment, wherein 3D elements form data placeholders or icons in within the user interface.

According to a further aspect of the present invention, there is provided a computer readable medium having computer executable instructions for performing the method recited above.

Illustrative embodiments of the present invention will now be described in relation to the accompanying drawings, in which.

Figure 8A:
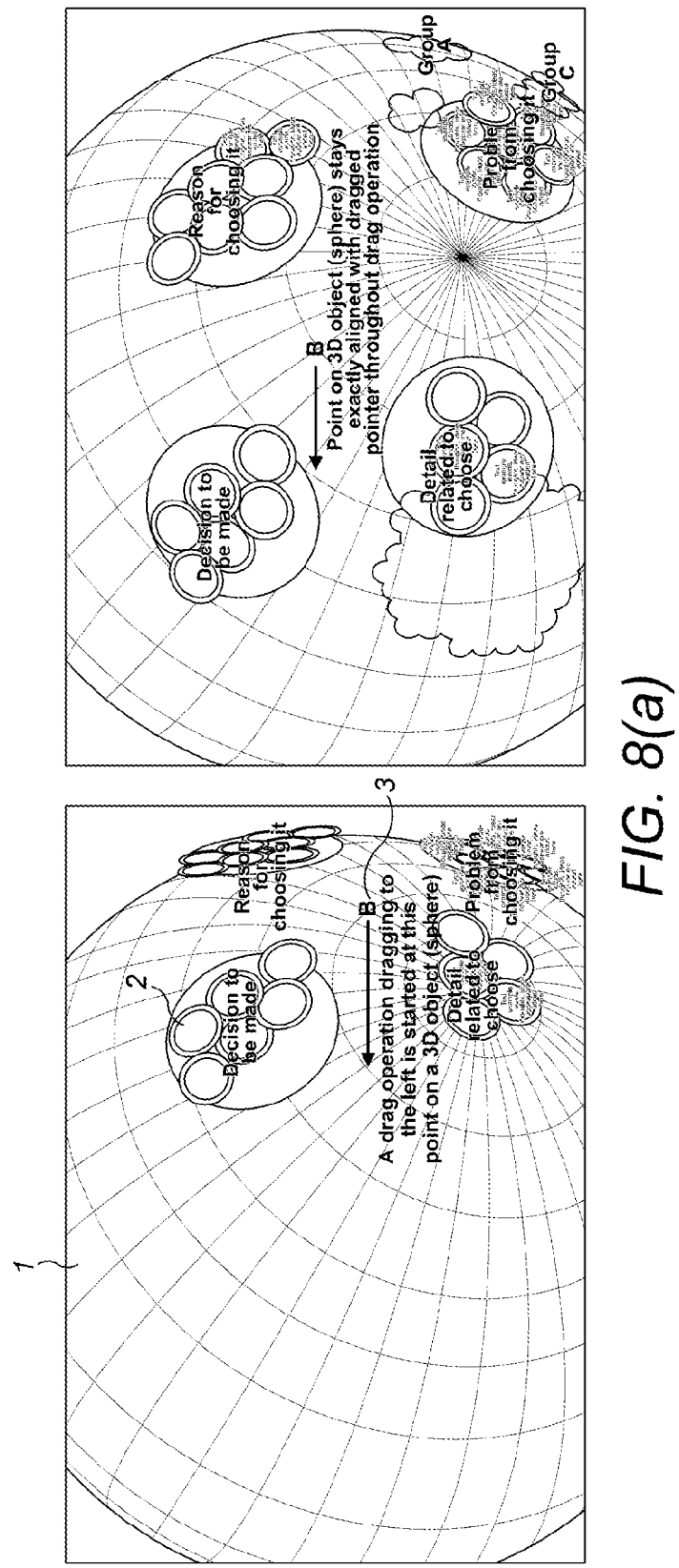
Figure 8B:
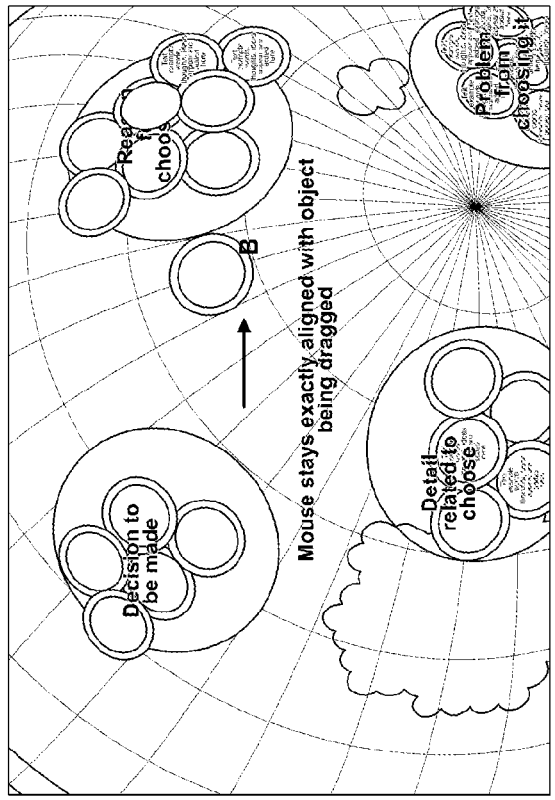
Figure 8B:
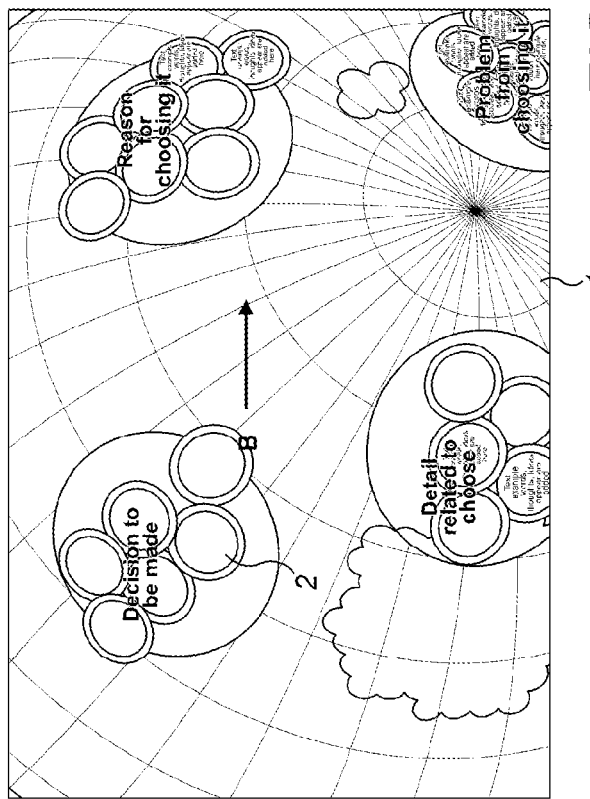
Figure 9:
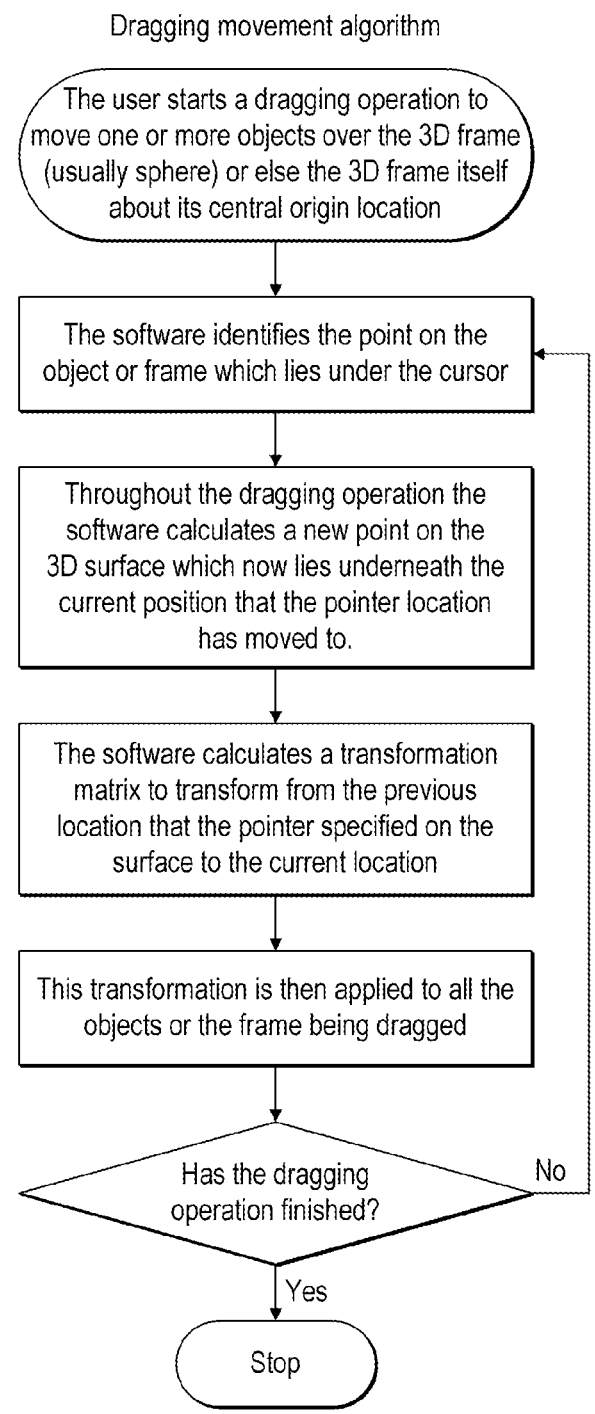
Figure 10:
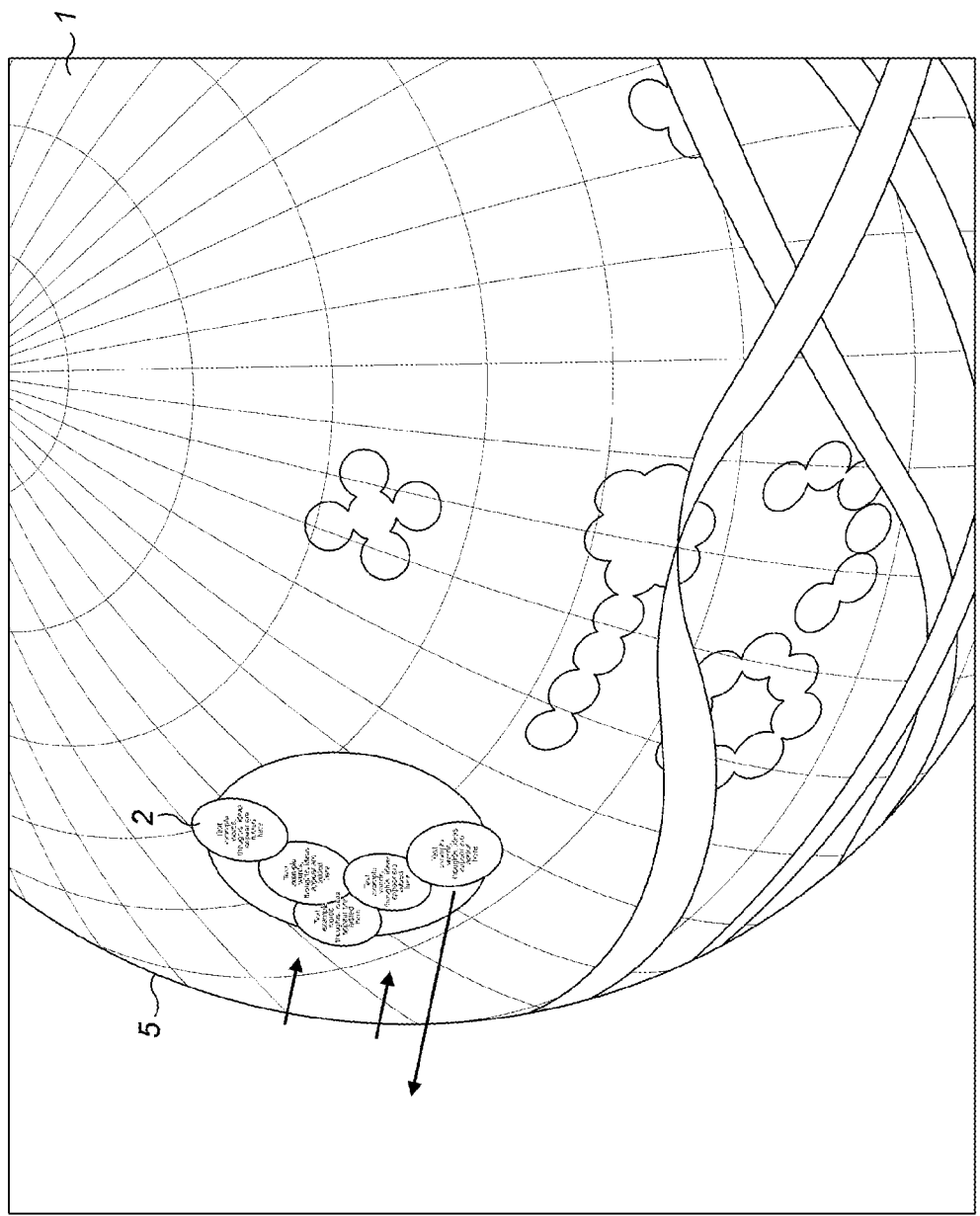
Figure 11A:
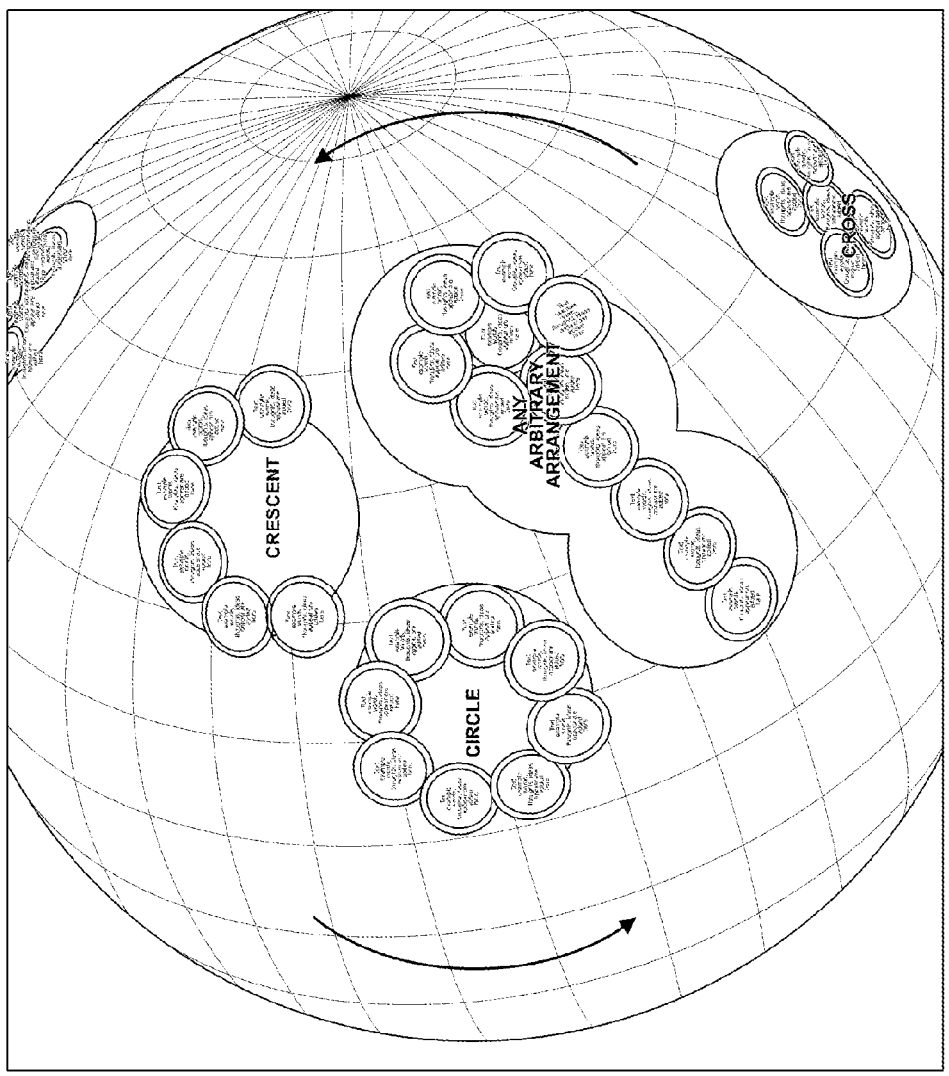
Figure 11B:
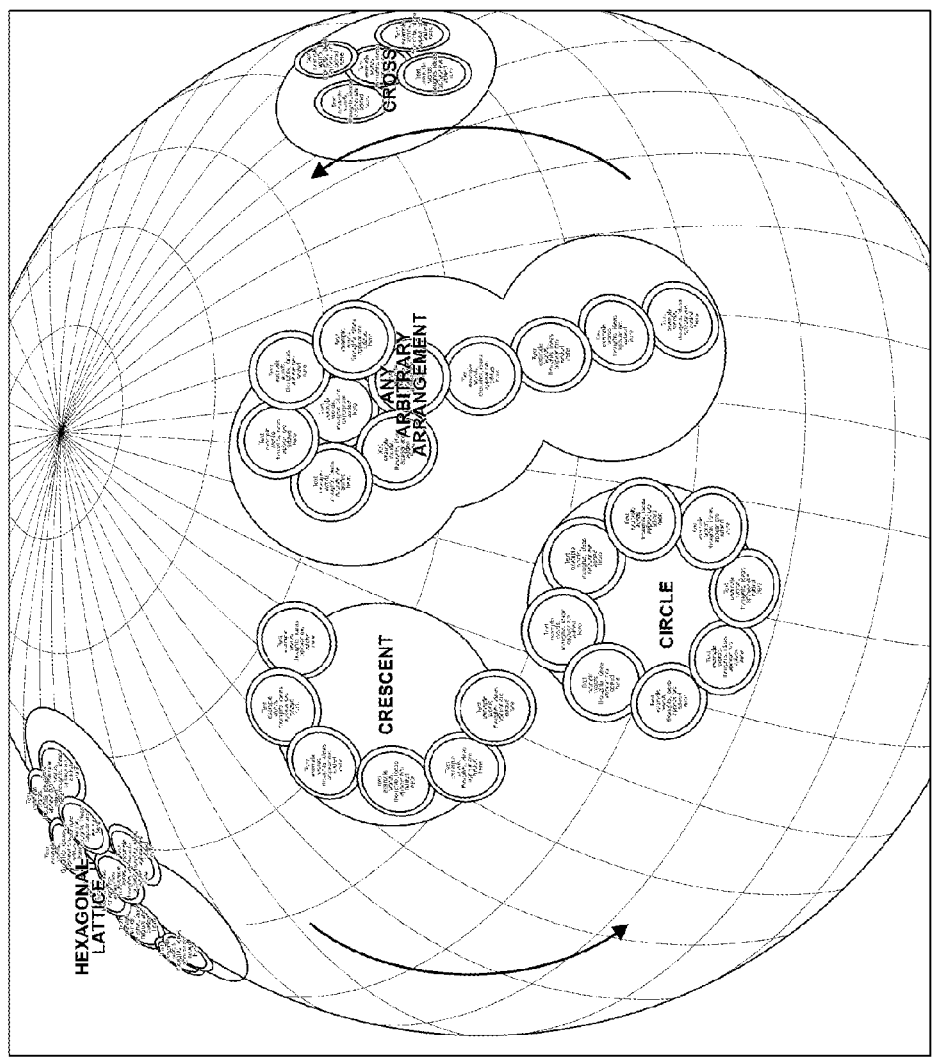
Figure 12:
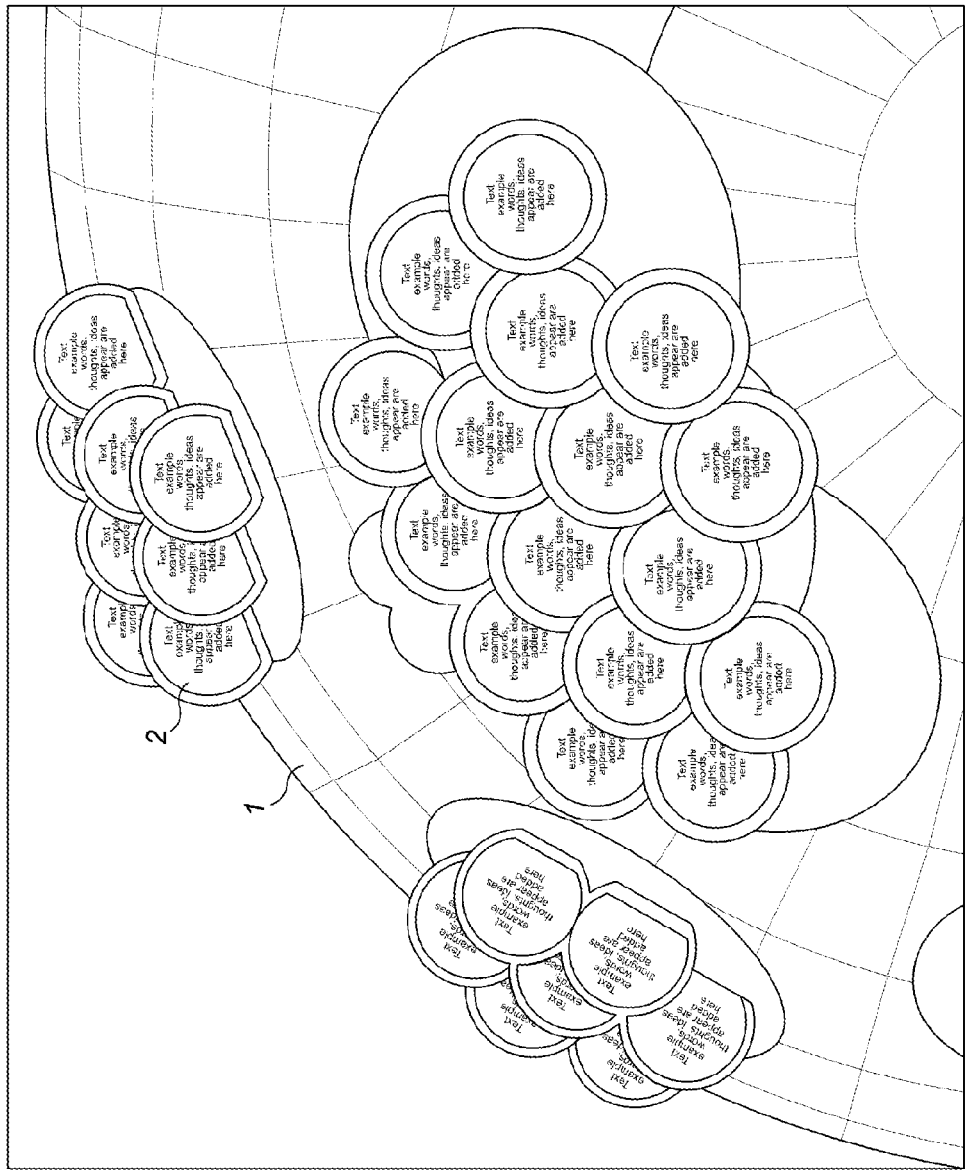
Figure 13:
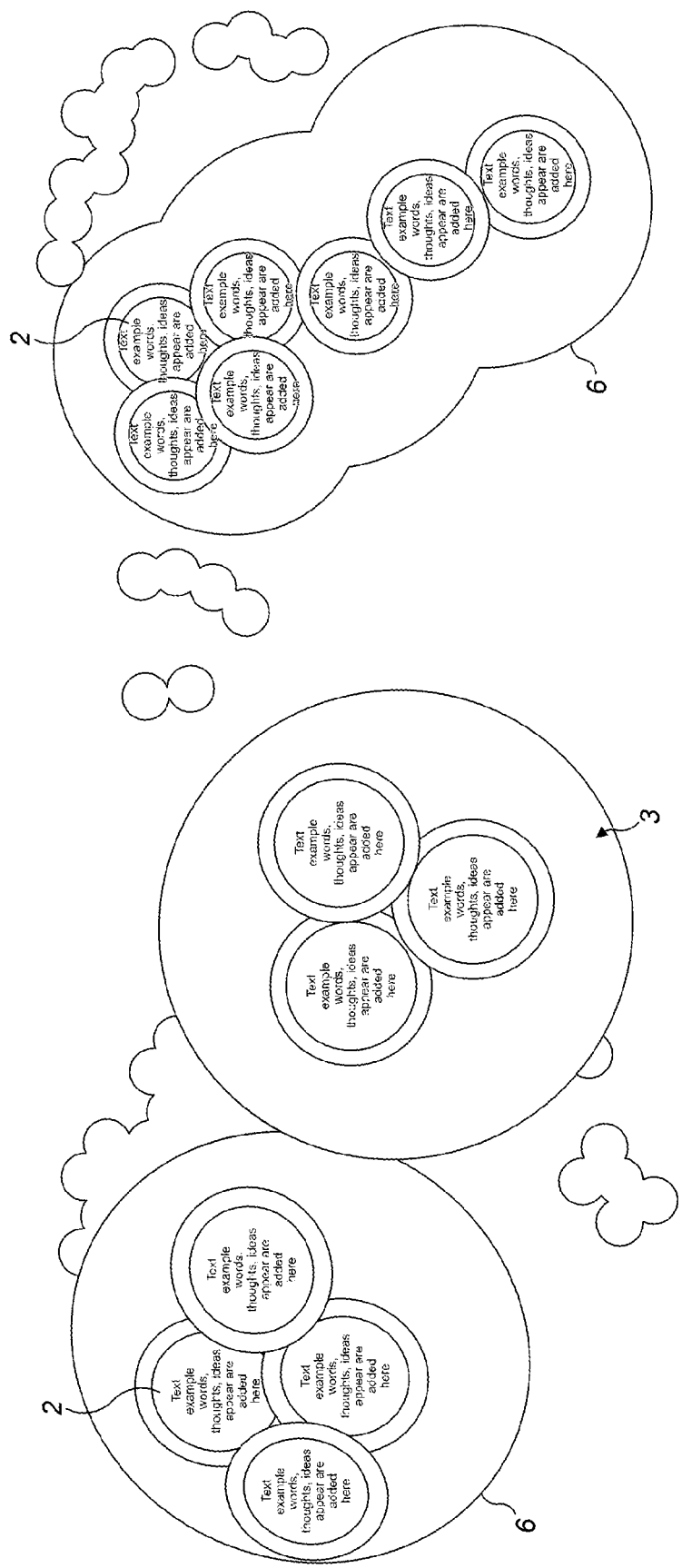
Figure 14:
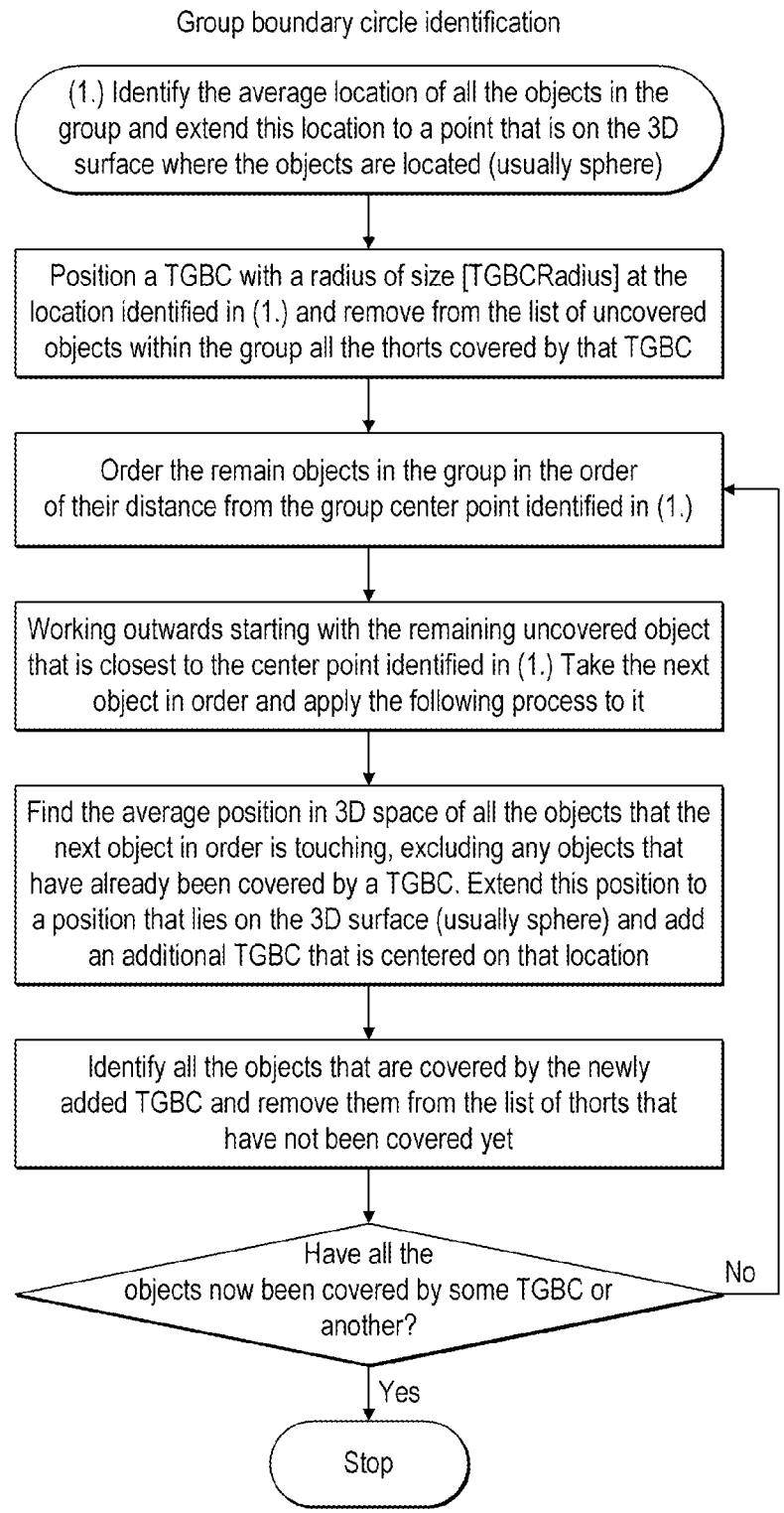
Figure 15:
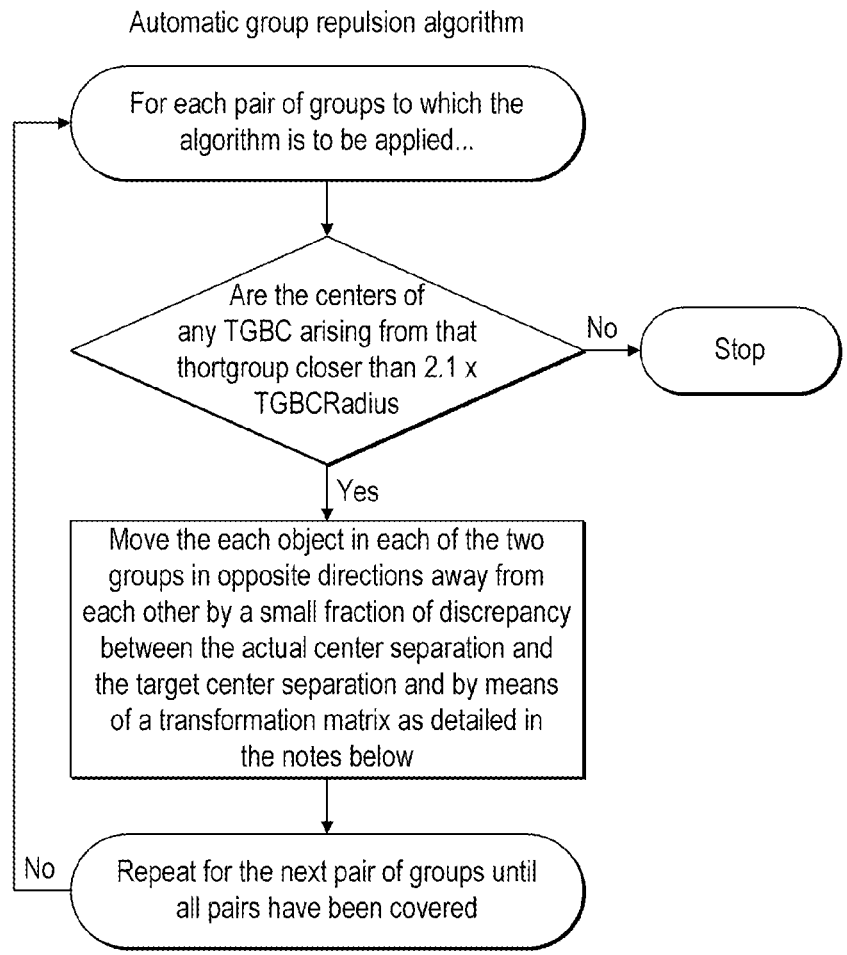
Figure 16:
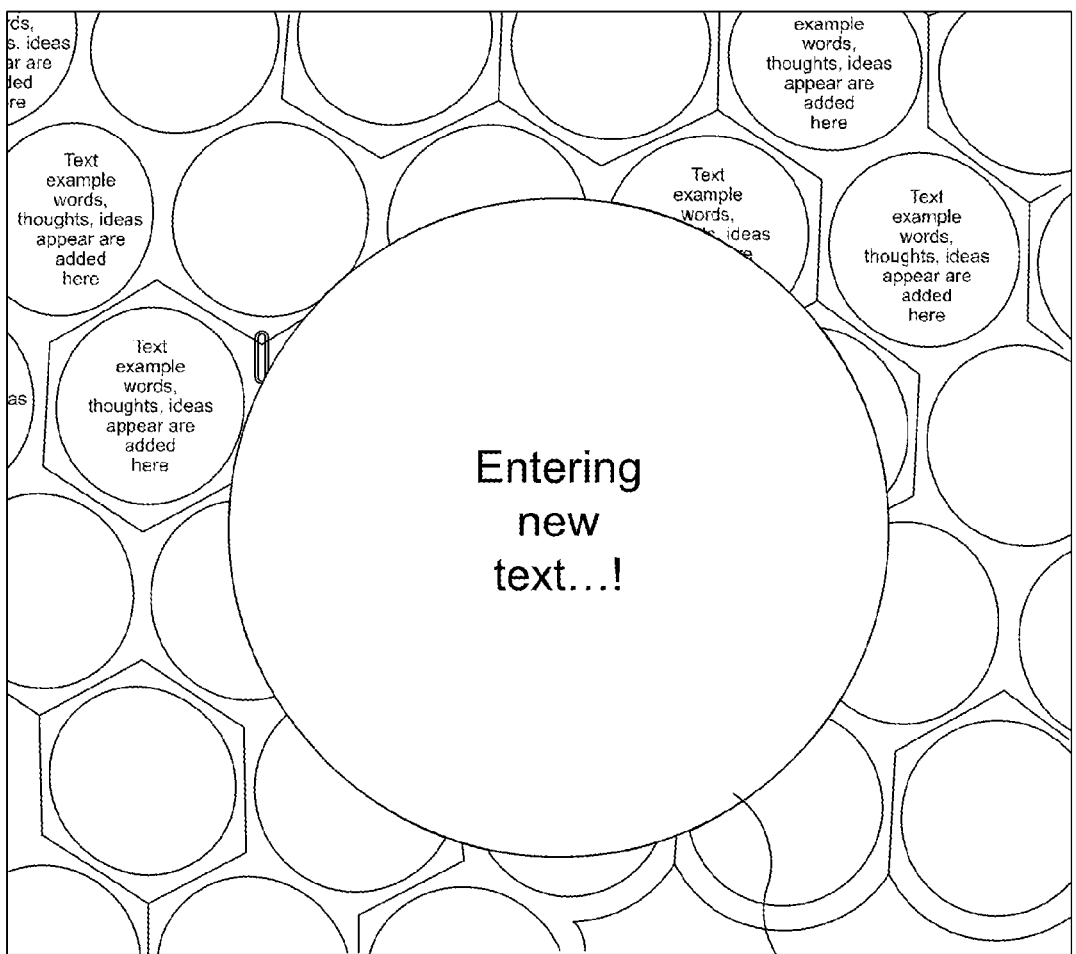
Figure 17:
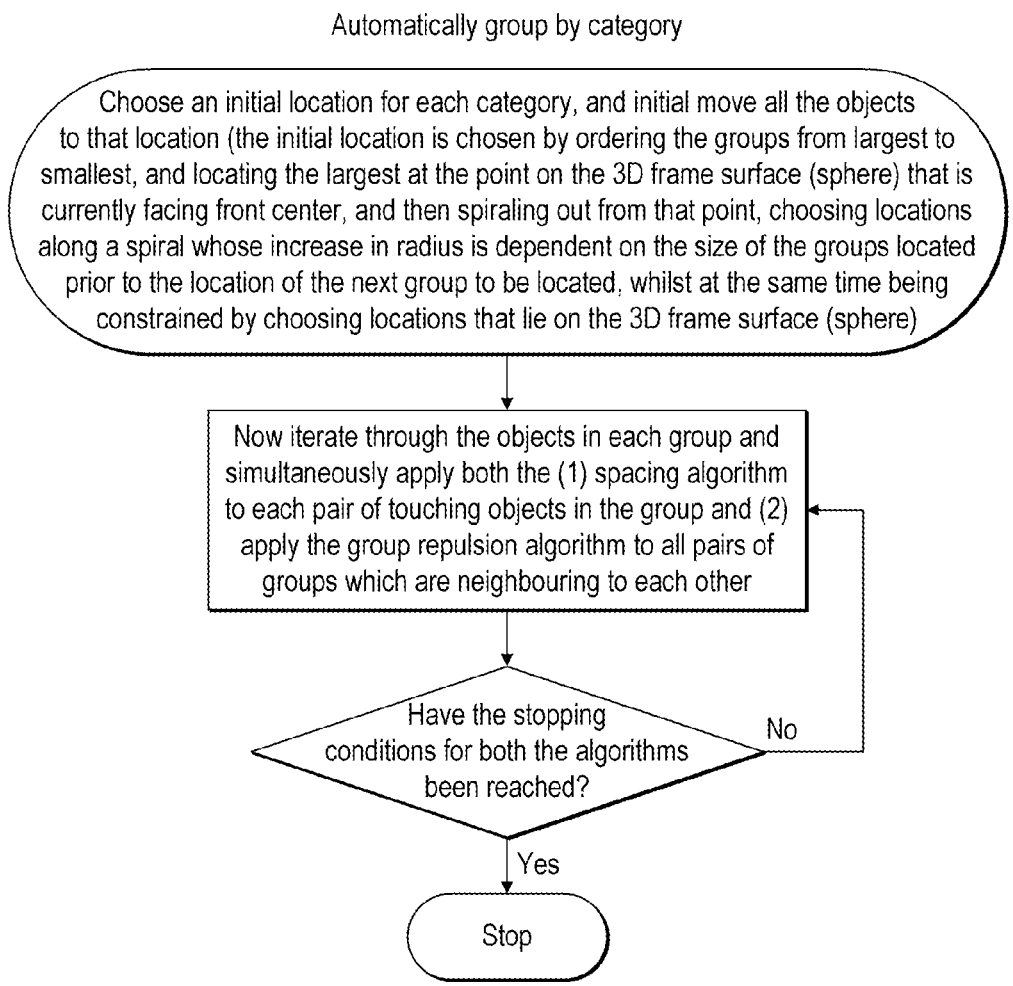
Figure 18:
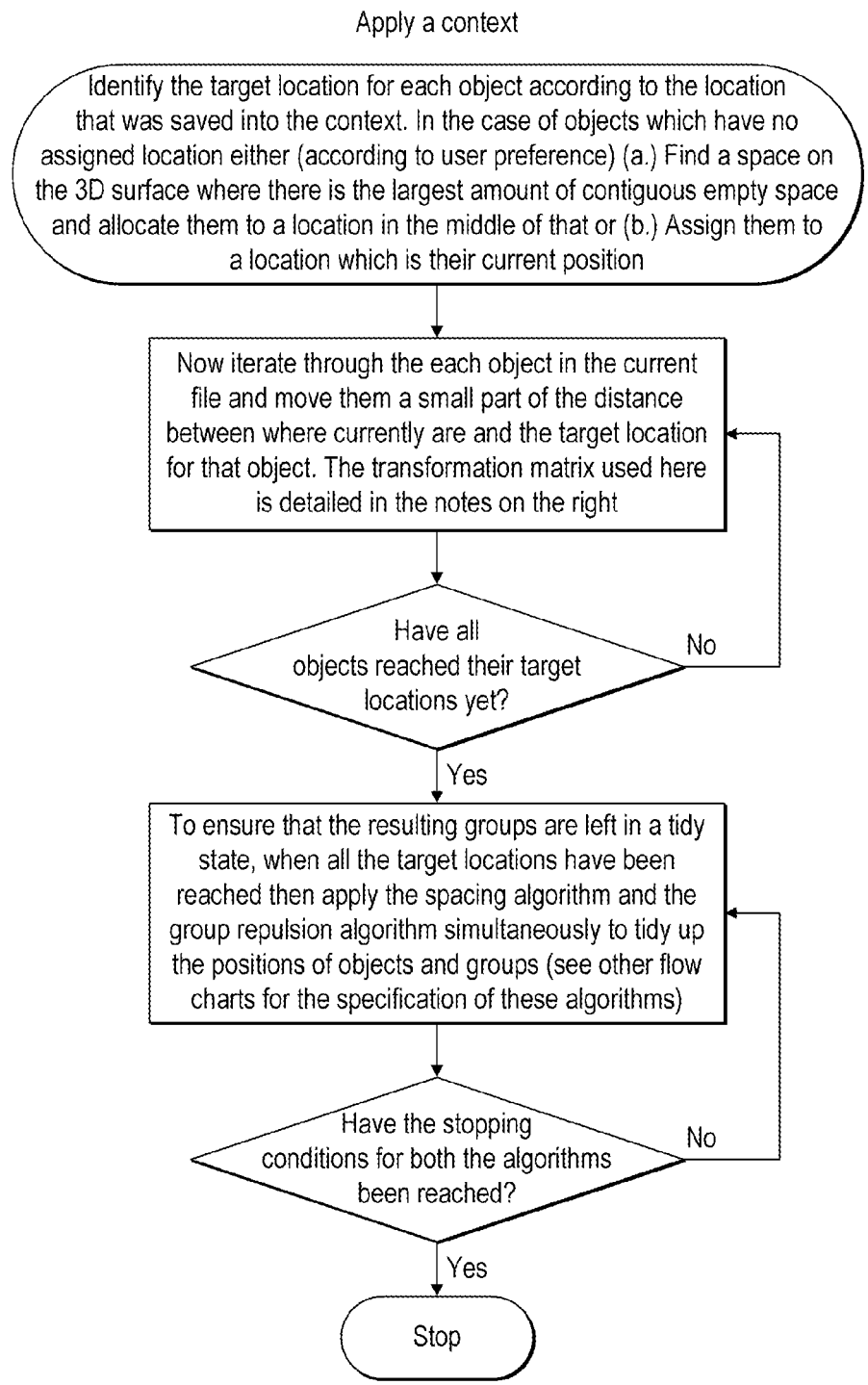
Figure 19:
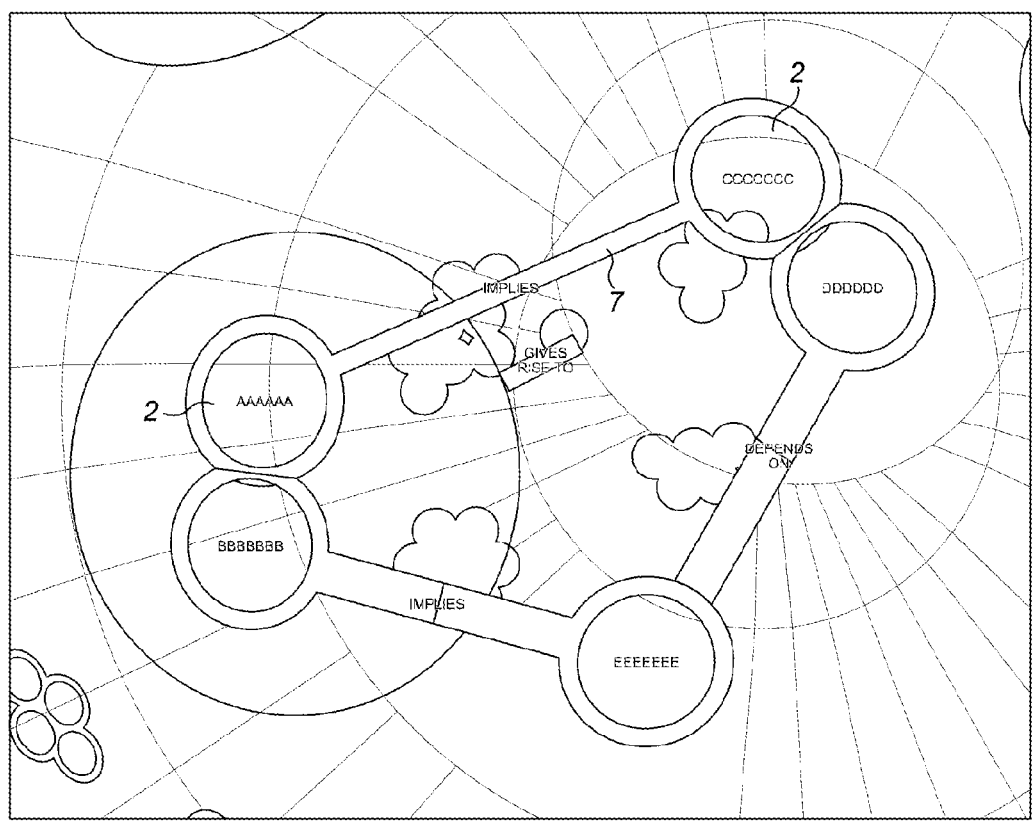
Figure 21A:
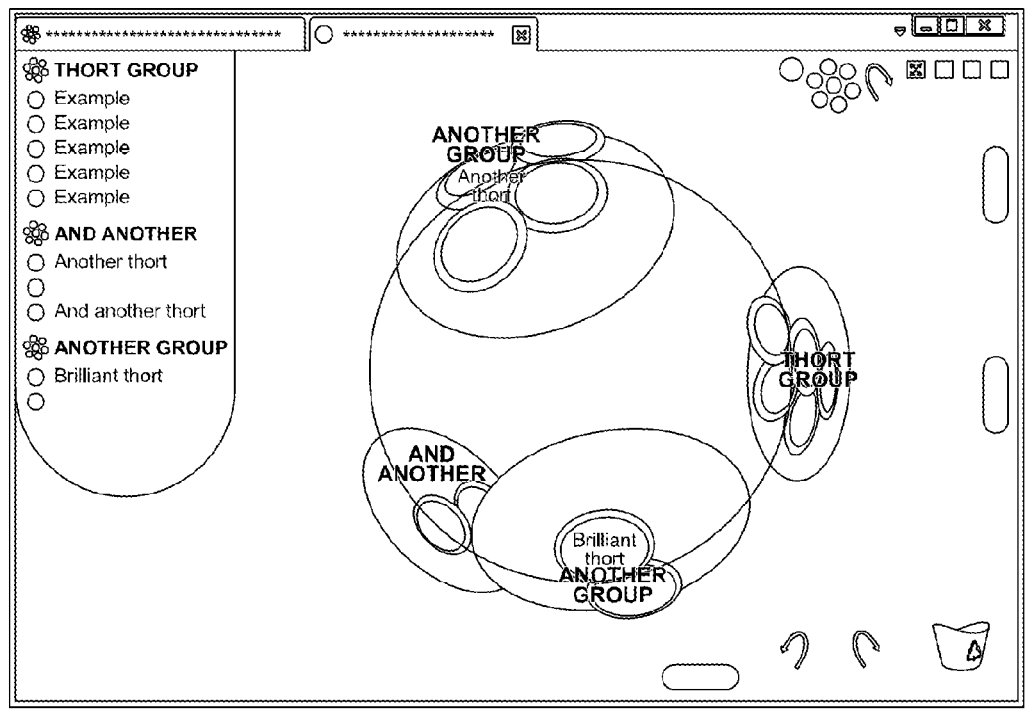
Figure 22:
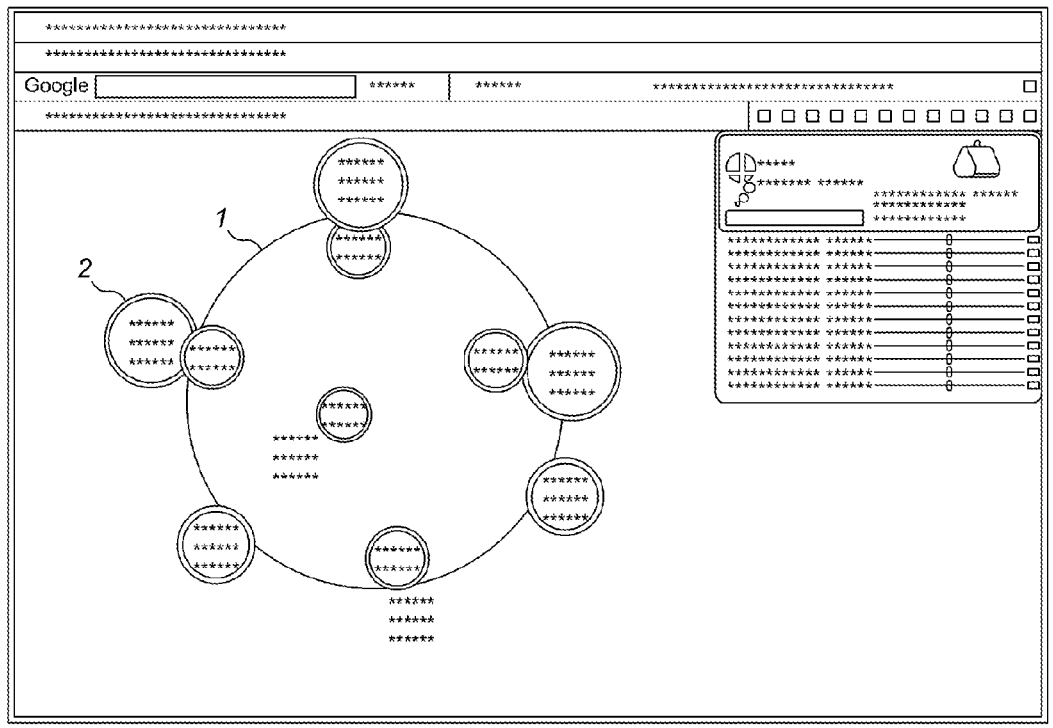
Figure 23:
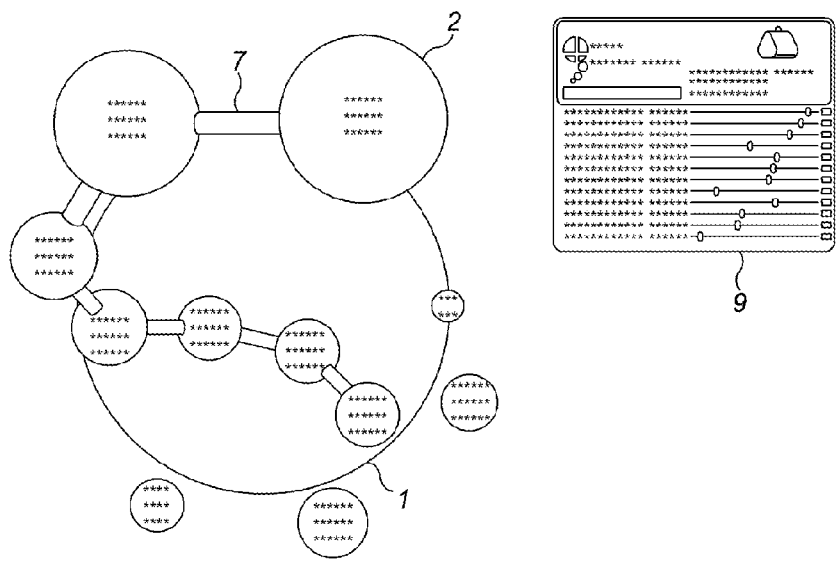
Figure 24:
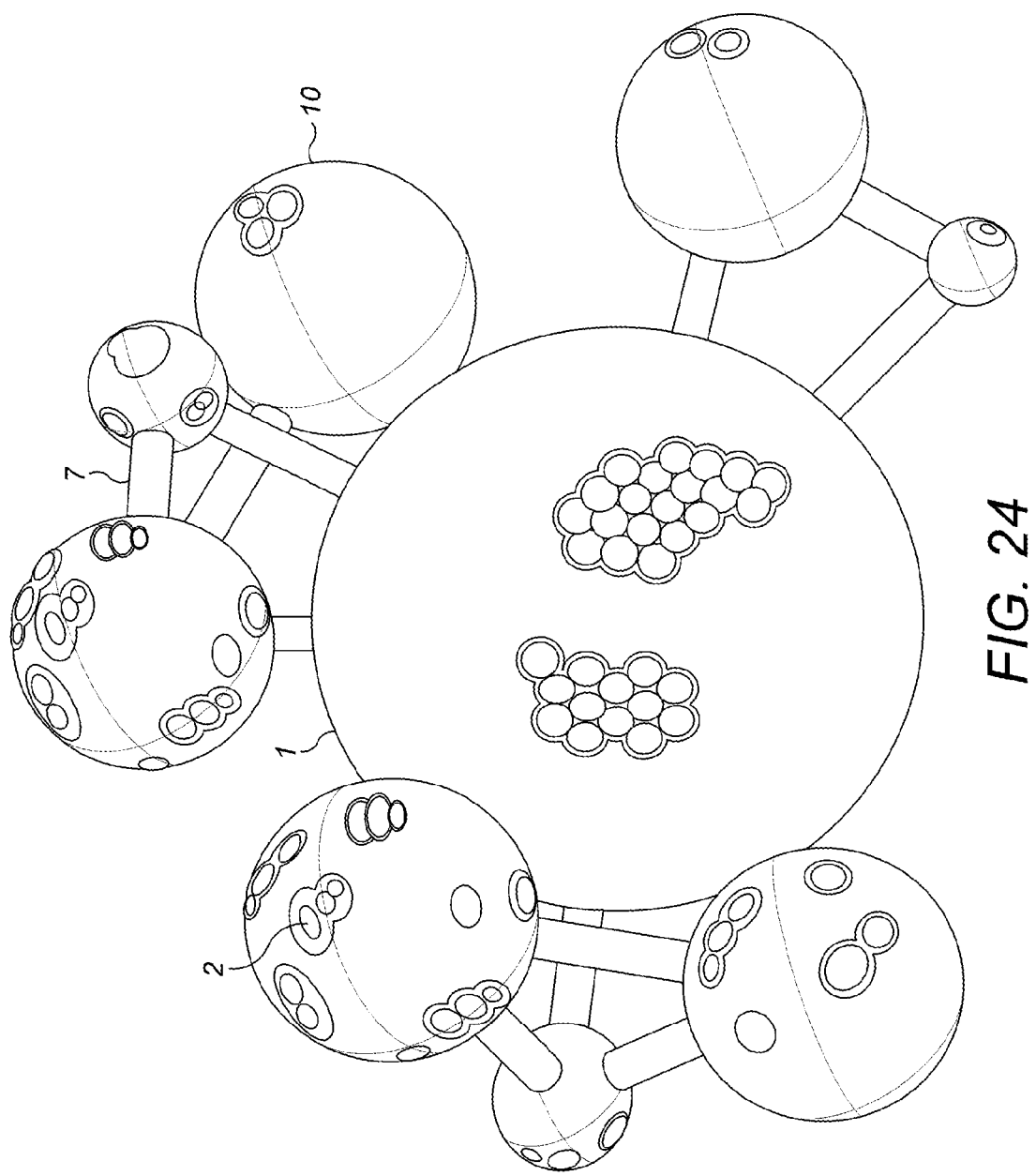
Figure 25:
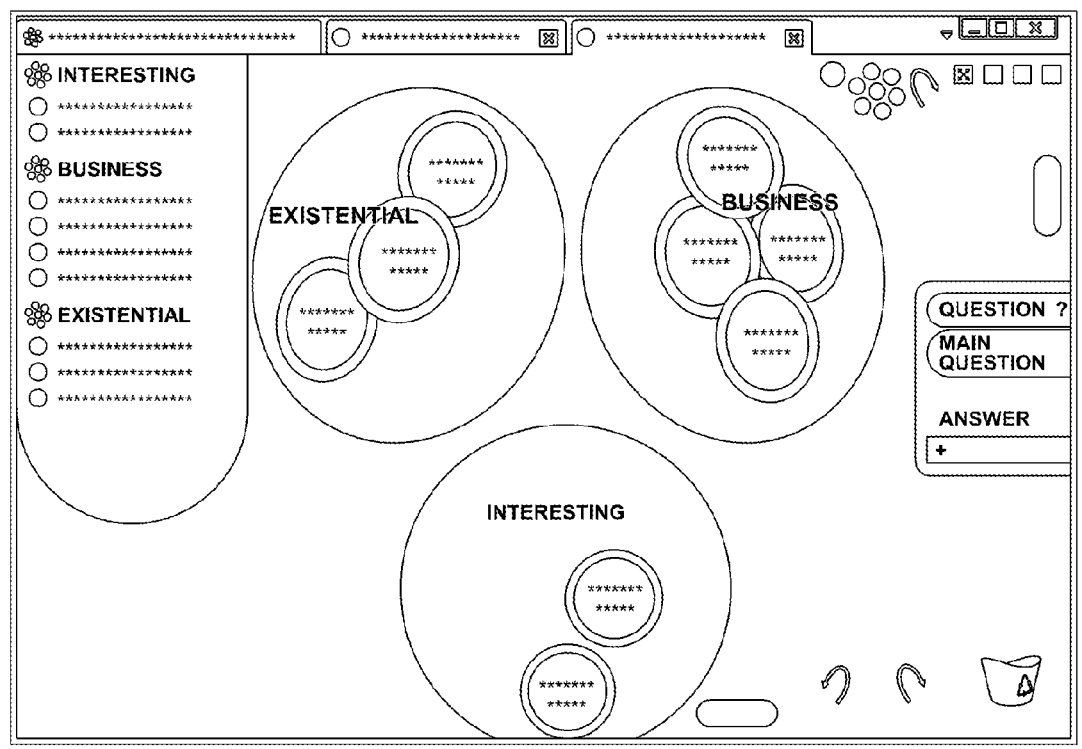

FIGS. 8(a) and (b) show the perfect dragging feature within the 3D environment;

FIG. 9 shows the 3D dragging spatial algorithm;

FIG. 10 shows the frame spin back feature;

FIGS. 11(a) and (b) show a feature for maintaining the upright orientation of objects within the 3D environment;

FIG. 12 shows a billboard mode for objects;

FIG. 13 shows automatic 3D object group identification and group boundary production features;

FIG. 14 shows the process of group boundary identification;

FIG. 15 shows the automatic group repulsion algorithm;

FIG. 16 shows an object during text editing mode;

FIG. 17 shows the process of automatic grouping by category;

FIG. 18 shows the process of applying different contexts to the objects;

FIG. 19 shows an implementation of linking lines or tubes between objects;

FIGS. 20 (a) and (b) show the hierarchy tree view functionality of the first embodiment of the invention;

FIGS. 21 (a) and (b) show before and after views of the all groups face user mode;

FIG. 22 shows a second illustrative embodiment;

FIG. 23 shows an alternative view of the embodiment shown in FIG. 22;

FIG. 24 shows a third illustrative embodiment;

FIG. 25 shows 3D objects which have a picture assigned to their category; and

Figure 26:
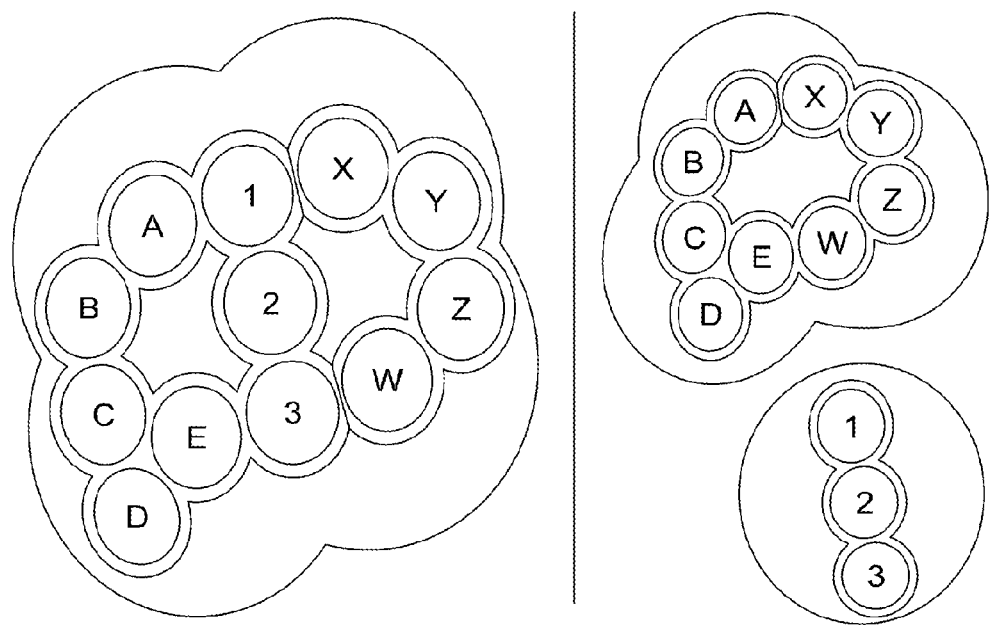

FIG. 26 shows a re-grouping operation.

The present invention concerns a GUI which capitalises on the standardised processing functions enabled by graphics processing units (GPUs) of modern computer circuits. In this respect, GPUs have highly parallel structures which are more effective than general-purpose CPUs for algorithms where processing of large blocks of data is done in parallel. In particular, GUIs are specifically constructed to perform certain graphical tasks, such as rendering polygons, texture mapping, and geometric calculations such as rotation and translation of vertices into different coordinate systems. The present invention makes use of these graphical capabilities by employing standardised 3D components to form place holders or icons and an associated frame within a 3D environment. As the relative positions of these objects and their interactions within the 3D environment may be computationally expressed using relatively simple algorithms and transformation matrices, the data required to express the GUI is relatively minimal, thereby minimising CPU and system memory requirements. The GPU therefore performs the bulk of the processing, but because this involves standard graphical tasks of the graphics pipeline, the 3D environment can be easily rendered by the GPU. This enables efficient usage of system resources.

Figure 1:
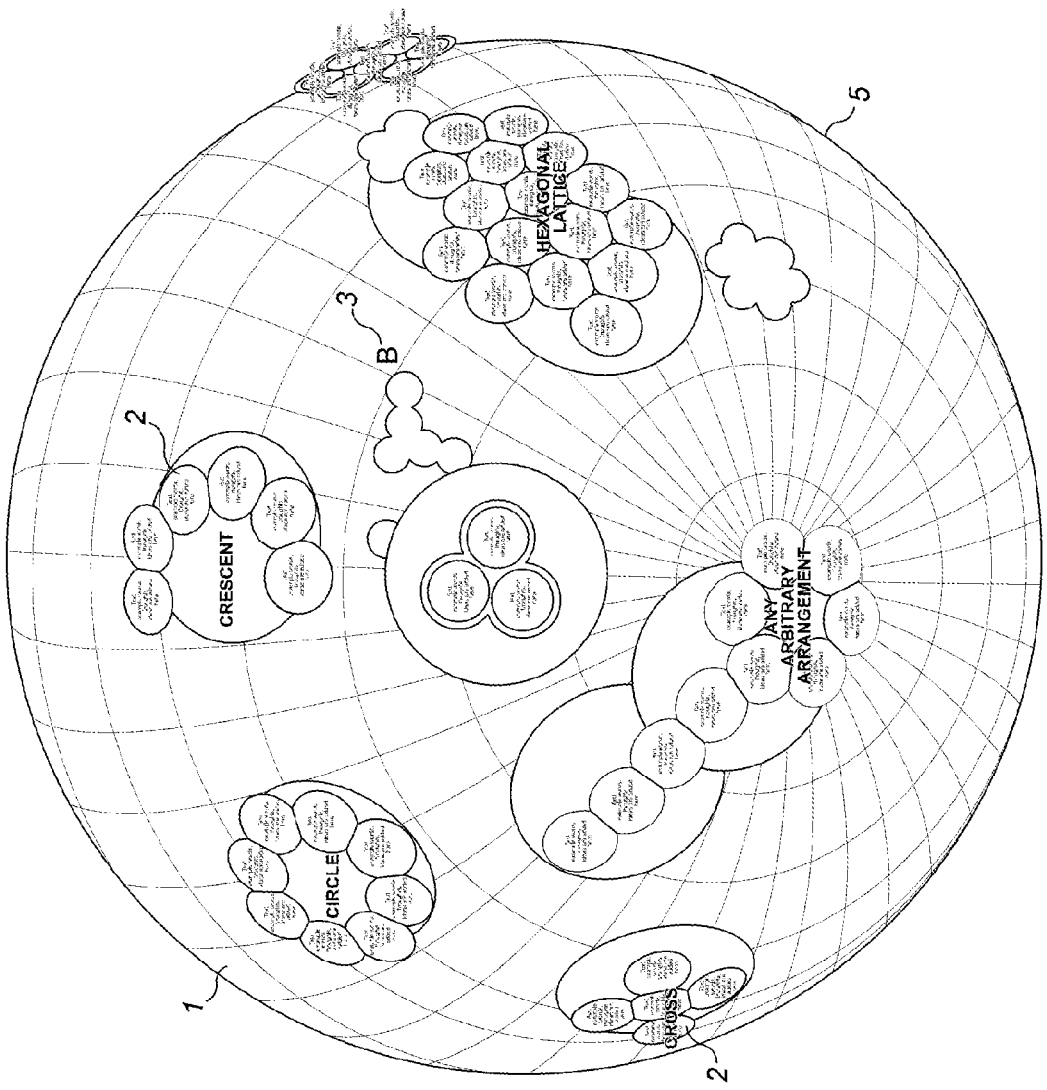
FIG. 1 shows a GUI according to a first illustrative embodiment of the present invention.

FIG. 1 shows a three dimensional (3D) spatial GUI of an embodiment of the present invention, as displayed on a display screen of a computing device. The GUI is for use as an information management user interface which allows for the collecting, grouping, arranging, relating, organising, processing and presenting of words, images, and document links, as 3D graphical objects within a 3D graphical environment. The simulated 3D graphical environment is created by means of computer software running on a computing device, such as a desktop computer, mobile computer or mobile device such as a smart-phone. The computer software may, for example, be stored on a storage memory on the computing device.

The simulated 3D environment contains a frame 1 and a number of graphical 3D elements or objects 2 which can be located at positions relative to the frame 1. Each 3D object 2 is assigned with graphical indicator such as textual data, a category colour, and/or 2D images. In addition to graphical indicators, other data may be assigned to the 3D graphical objects 2, such as links to stored documents, data files, or web pages. A user can rotate the 3D frame 1 within the 3D environment in order to view or access the different 3D objects 2.

In order to create the 3D environment, a 3D graphic programming framework is used, such as Microsoft's XNA framework (which runs on top of Microsoft's DirectX technology), Direct programming of Microsoft's DirectX, OpenGL, and WebGL. Software development environments which can be used to develop programs using these frameworks include Microsoft's Visual Studio development environment and Eclipse development environment.

Frame

In this embodiment, the 3D frame 1 has a sphere shape. In use, the plurality of 3D objects 2 can be placed onto, or at positions relative to, the surface of the 3D frame 1. As such, the 3D frame provides the 3D object data items with a location inside 3D space.

Figure 2:
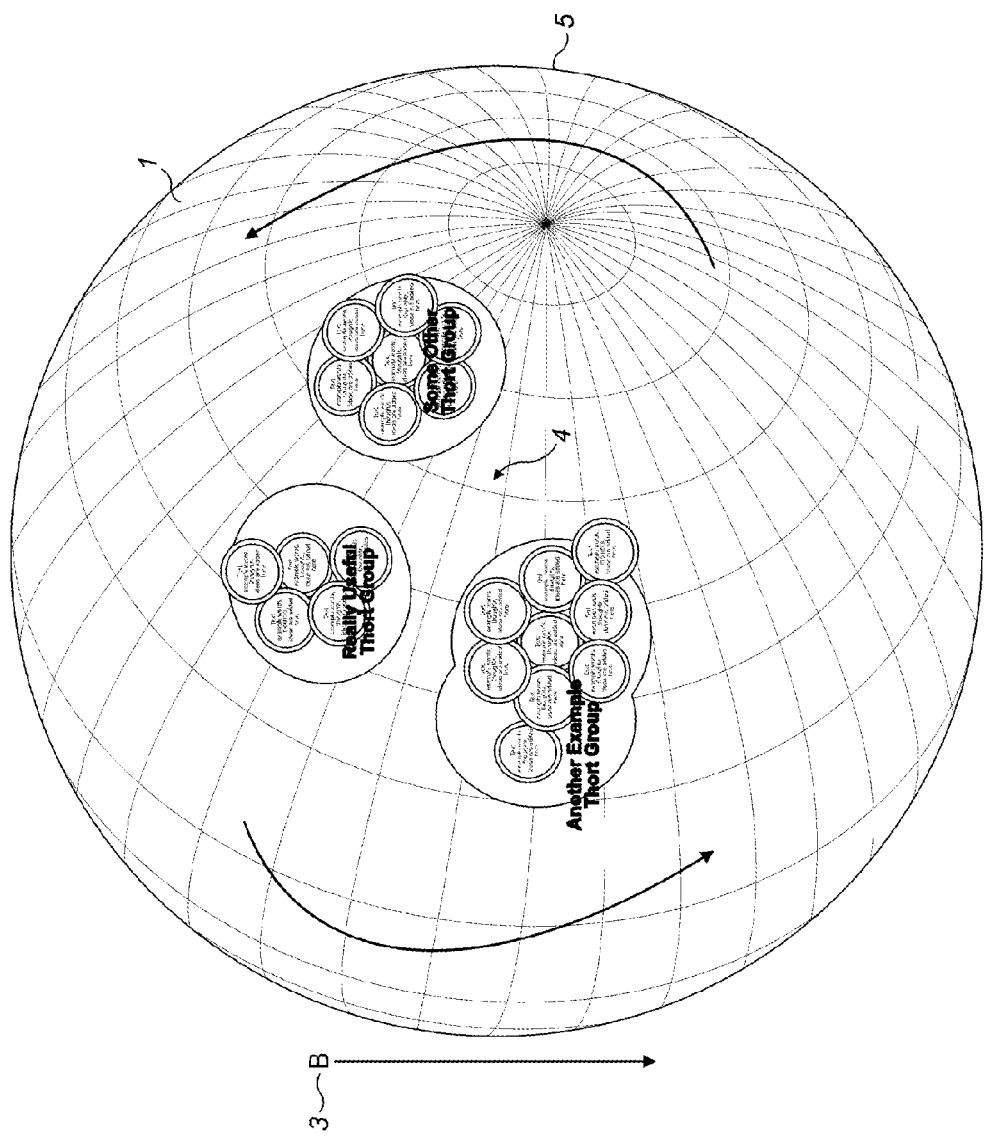
FIG. 2 illustrates various ways in which the frame can be rotated.

The user is able to rotate the 3D frame 1 using a cursor 3 in order to bring different 3D objects 2 into view. The cursor may be controlled, for example, by a mouse, touch screen, or gesture technology (e.g. Kinect®). FIG. 2 illustrates the various ways in which the frame 1 can be rotated, namely:

a) By selecting a point within the sphere with the cursor and dragging the frame 1 in any direction they choose;

b) By pointing the cursor 3 outside the sphere in a designated area and clicking to cause the frame 1 to rotate about its axis. For example, the frame 1 could be programmed to rotate about an axis 4 that comes directly towards the user by pointing the cursor to a position which lies outside of the horizon 5 of the sphere; and c) Flicking the 3D frame surface with the cursor 3 can cause the frame 1 to spin and gradually slow down as though it was affected by a rotational drag.

Variable Transparency of the 3D Frame

Figure 3:
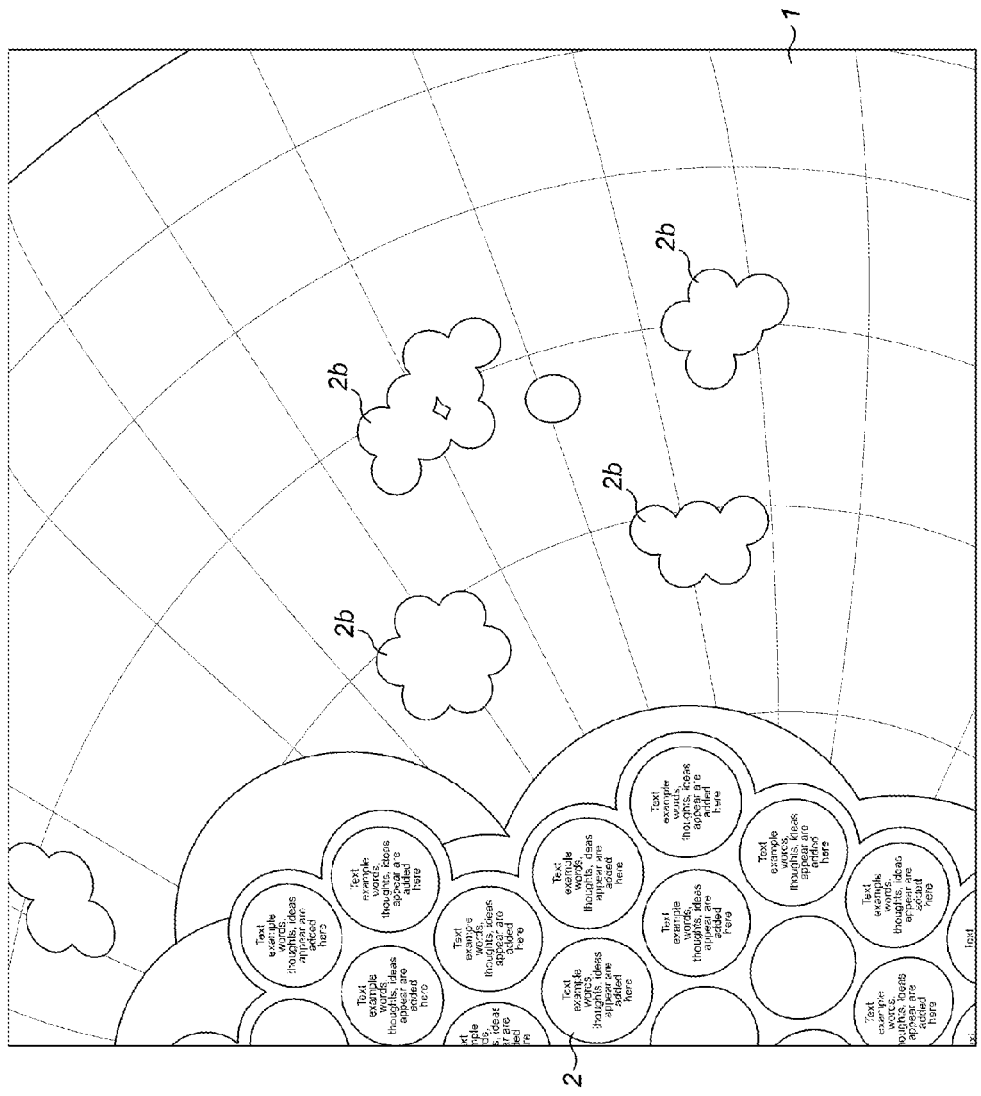
FIG. 3 illustrates variable transparency of the 3D frame.

In order to allow a user to see the whole of the landscape of objects on the frame 1, the GUI can be programmed to automatically adjust the transparency of the frame 1 so that, whenever a user desires, they are able to see objects 2 on both the front and back of the frame 1. FIG. 3 illustrates this, showing a section of the frame 1 shown in FIG. 1, with objects 2b shown on the rear of the frame 1. This variable transparency may be activated, for example, when the user's cursor clicks and drags the 3D frame 1.

Zooming

Functionality may be provided to allow the user to zoom in and out on the frame 1. If the GUI is provided on a regular desktop PC, this may be effected using the scroll wheel on the mouse. On a touch screen, zooming might be effected, for example, by pinching with two fingers.

Frame Radius

Functionality may be provided to allow the radius of the frame 1 to be increased or decreased to vary the space available for placement of data objects 2. This may be implemented by, for example, dragging the edge of horizon 5.

During this process, the proximity of objects 2 which other 3D objects are touching and which have links with other 3D objects, is generally maintained by repeatedly applying the _automatic spacing algorithm_, as is discussed in further detail below.

Frame Shape

Although in this embodiment a spherical frame 1 is used, it is also envisaged that other shapes of frames could also be implemented, such as a terrain surface (which is defined by contours) or a cylinder.

Furthermore, the GUI may allow for the transmutation between alternative frame shapes, under which the proximity of the placed 3D objects 2 is maintained. Such transmutation may be achieved by:

a. The initial surface of the frame 1 is divided up in zones that are approximately the size of a single 3D object.

b. The target surface (i.e. the surface of the new frame 1 being changed to) is similarly divided up into the same number of zones, and a one to one mapping is established between zones on the initial surface and zones on the target surface.

c. The software iterates through each group of 3D objects 2 being transmuted and identifies the zone of the average 3D object location of the 3D objects 2 in that group.

d. This group of 3D objects 2 is then allocated to the corresponding zone on the new surface and located such that the average 3D object 2 location is centred on that corresponding zone.

e. All the 3D objects 2 in each transferred group are initially given locations at corresponding distances around their original average location. These locations are then projected to comply with being a set distance above the new surface they are on.

f. Finally the _automatic spacing algorithm_ is repeatedly applied, as discussed in more detail below.

3D Objects

The 3D objects 2 function as icons or data place holders within the GUI. As such, the 3D objects 2 have a graphical indicator assigned to them, which appears on their surface to identify the object to the user. The graphical indicator may include one or more of a colour, a picture, and text. Other data can also be assigned to the 3D graphical objects, such as links to stored documents, data files, or web pages. In this respect, the graphical indicator assigned to a particular 3D object may provide a sample image or icon representing the document, data file or web page associated therewith.

Figure 4:
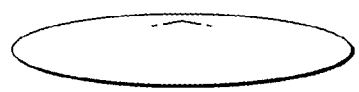
FIG. 4 shows perspective (a), side (b) and plan 8 views of the 3D objects used in the first embodiment.
Figure 4:
Figure 4:
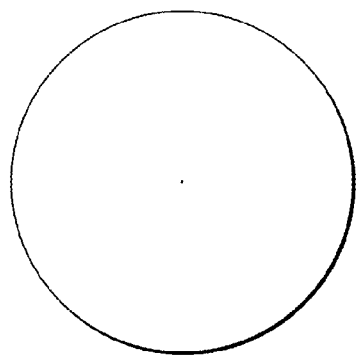

FIG. 4 shows perspective (a), side (b) and plan 8 views of the 3D objects 2 used in this embodiment of the invention. As shown, the 3D objects 2 are formed as flat cones, which have a small height compared to the cone radius (typically a ratio in the region of between 1:10-1:30, and preferably 1:20). At this ratio, the 3D objects 2 appear on casual inspection to be circular discs. This allows a user to easily recognise and comprehend text or pictures which may be assigned to the 3D object 2 as its graphical indicator. That is, the almost circular shape avoids excessive warping of such text or pictures.

With the flattened cone construction, when groups of 3D objects 2 are arranged together, they can appear perfectly joined along a line that is perpendicular to the line that joins the two centres of the two joining objects 2 (see FIG. 5(*a*)).

The 3D objects 2 are placed within the 3D environment, located at positions relative to the 3D frame 1. In this embodiment, the 3D objects 2 are located at a fixed distance above the displayed 3D surface the frame 1, such that they appear to be hovering above it. As each 3D object 2 is maintained at constant distance from the origin centre of the frame sphere, groups of 3D objects 2 effectively curve over the surface of the sphere, so as to take up the shape of a spherical surface themselves (see FIG. 6). In this respect, the flattened cone construction therefore effectively mates with the surface frame 1 (or rather, in this embodiment, the notional position in space a fixed distance above the 3D frame).

In this embodiment, the 3D objects 2 are always positioned so that the axis of the cone is perpendicular to the tangential plane of the point on the surface of the 3D frame 1 that the object 2 is situated over (and which point the axis of the object 2 therefore passes through where it intersects with that plane). As such, in embodiments where 3D frame 1 is a sphere, the 3D objects 2 are kept at this constant distance above the surface of the sphere, by having all transformations that are applied to the location of the 3D objects 2 be rotational transformations about an axis that passes through the centre of the frame 1, and is perpendicular to the axis of the object 2 as it passes through the centre of the frame. This axis can be calculated using the following result from 3D Vector geometry—the direction vector of the axis of rotation equals the cross product (vector product) of the starting location vector and the ending location vector (after it has been transformed by the rotation transformation). This can be expressed in notation as: V(axis)=V1×V2.

The angle required to specify the rotation matrix is calculated using the following standard result from 3D Vector geometry. The angle is the arc-cos of the dot product of the starting location vector and the ending location vector (after it has been transformed by the rotation transformation). This can be expressed as: Angle=$\cos^{-1}$ (V1.V2).

A transformation matrix representation of this transformation can then be constructed as follows:
I. Given that V(axis) is the axis of rotation and Angle is the angle of rotation and
a=V(axis) which has x, y and z components: a.x, a.y and a.z
c=cos (Angle) and
s=sin (Angle) and
t=1−c M_rotation =

$$\begin{pmatrix} t*a.x*a.x+c & t*a.x*a.y-s*a.z & t*a.x*a.z+s*a.y & 0, \\ t*a.x*a.y+s*a.z & t*a.y*a.y+c, & t*a.y*a.z-s*a.x, & 0, \\ t*a.x*a.z-s*a.y & t*a.y*a.z+s*a.x, & t*a.z*a.z+c & 0, \\ 0, & 0, & 0, & 1 \end{pmatrix}$$

Many 3D programming frameworks provide a function that produces the above matrix. XNA for example provides the function: M=Matrix.CreateFromAxisAngle(axisToRotateAbout, angleToRotate).

Collision Detection and Iterative Distancing

Collision detection is used in the GUI to automatically manage the grouping of 3D objects 2. When one 3D object 2 is pushed against another beyond the point of touching, the other 3D object 2 is moved away. Consequently, the 3D objects 2 appear to have a tangible existence inside the 3D environment. At the same time, the 3D objects 2 are made Asticky@ by use of such collision detection and iterative distancing rules which, being applied at the level of individual 3D objects 2, gives rise to the emergent behaviour of forming quasi-hexagonal lattices of groups of 3D objects 2.

Figure 5A:
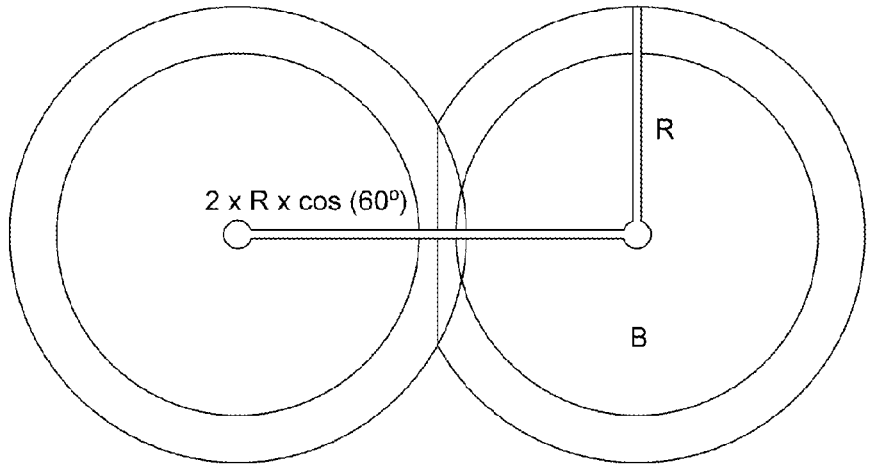
FIG. 5 (a) shows the target separation distance of two touching objects and (b) shows a quasi-hexagonal lattice arrangement of a group of objects.
Figure 5B:
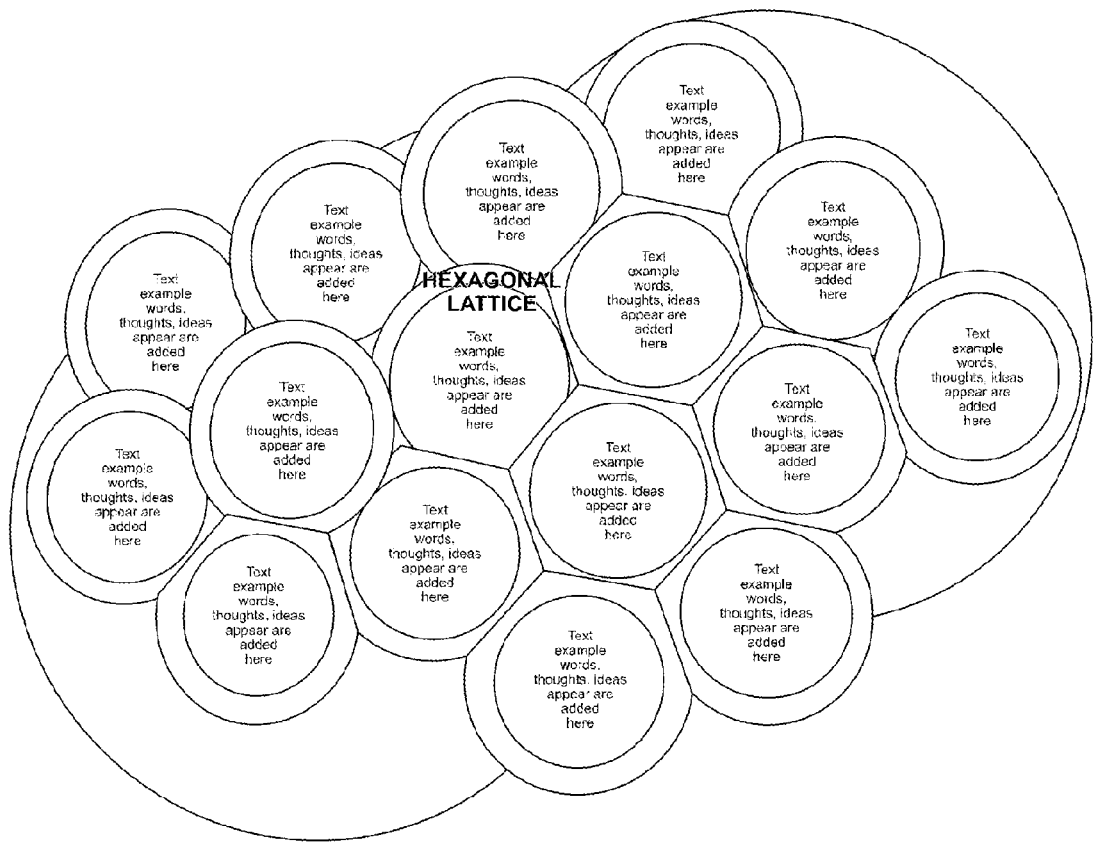
Figure 6:
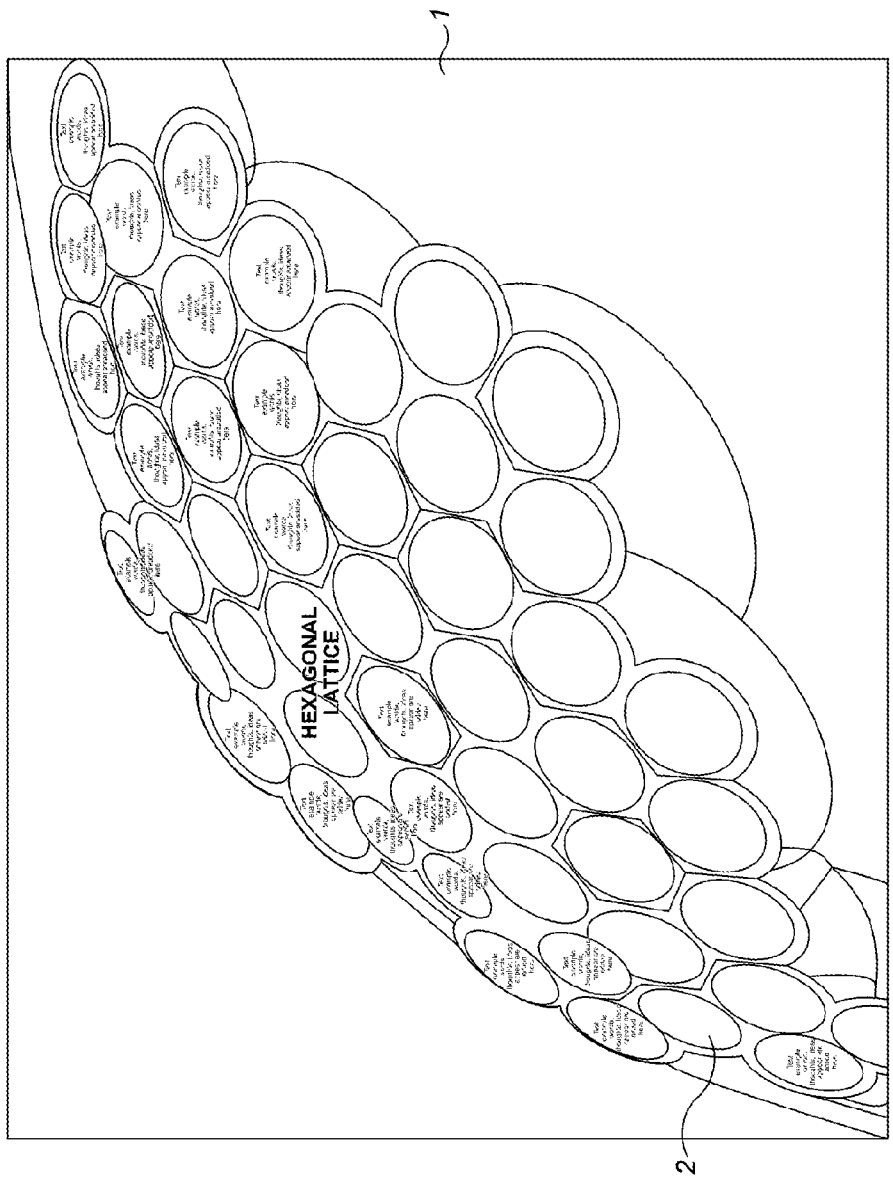
FIG. 6 shows a lattice arrangement of objects curved to the surface of the frame.

The use of iteration together with the flat cone 3D objects 2 results in lattice arrangements being automatically generated that are quasi-hexagonal in nature but curved to adhere to the shape of whatever 3D object they lie over, as shown in FIGS. 5(b) and 6.

Figure 7:
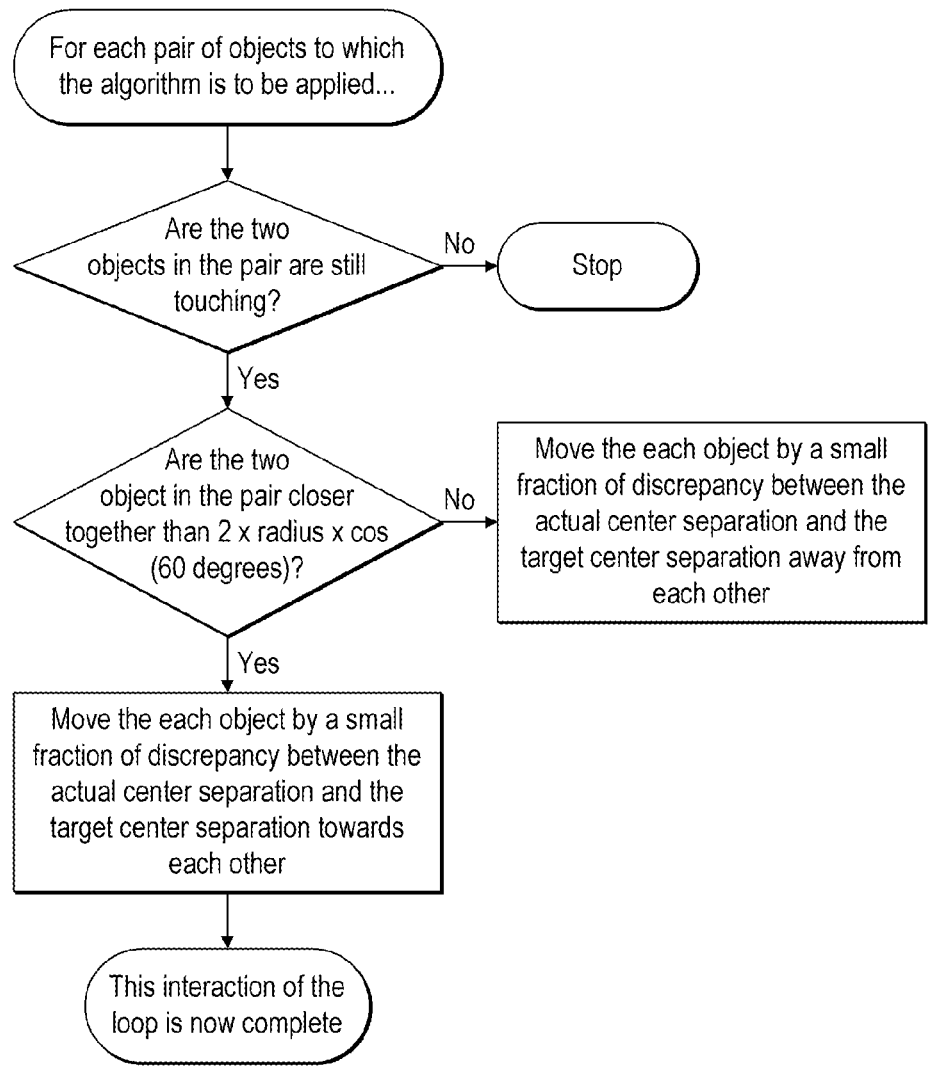
FIG. 7 shows an automatic spacing algorithm used in the first embodiment.

To effect collision detection and iterative distancing, the GUI applies an automatic spacing algorithm which is described in FIG. 7. When one 3D object is brought up next to another 3D object, as soon as they touch they become attracted to each other so that they stick together in order that their centres are at a ATarget Separation Distance@ of 2×radius of the 3D object×cos (60 degrees) (see FIG. 5(a)). This separation distance of the centres of any two of the 3D objects 2 located in 3D space is easily calculated using a standard formula from 3D vector geometry. Once you know the location vector V1 of the centre of the first 3D object, and the location vector V2 of the centre of the second 3D object, the distance between the 2 centres is simply the length of the vector V1-V2.

The movement of objects 2 and groups of objects away from each other is achieved by means of a transformation matrix. The transformation matrix is calculated such that while moving away from each other, all the objects 2 within the two groups are also constrained to stay attached to the 3D surface of the frame 1, and to stay at a tangent to that surface. As the frame 1 is typically a sphere, the transformation matrices are typically rotation matrices whose axis of rotation passes through the centre of the sphere, and lies at a right angle to the plane that contains both the start point of the average location of all the 3D objects 2 in each of the two groups.

The above applies to all 3D objects 2 that are situated on the 3D frame 1. Consequently, groups of 3D objects 2 that are touching tend to form a hexagonal lattice, without the user needing to deliberately position them in this configuration (see FIG. 5(b)). In this respect, it will be noted that in this embodiment, as shown in FIG. 5(a), each 3D object has a peripheral zone around its base which can overlap with an adjacent 3D object. This allows more tightly packed hexagonal lattices to form.

The present invention makes use of a game loop process in order to implement the Target Separation Distance between the 3D objects 2. The game loop process typically runs once for every display frame that is presented to the user. A good 3D graphics engine will present the user with about 60 frames per second (i.e. at or slightly above the refresh rate of a typical display screen). On each iteration of the game loop, the GUI calculates a view of the 3D graphic objects 2 as they would appear to an imaginary camera that is located at a predetermined position inside the 3D environment. This single display frame is then displayed to the user, as one of those 60 display frames being displayed every second.

The repetitive occurring of the game loop can be made to trigger various software sub-routines when it so happens that certain conditions are met. For example, if one 3D object 2 is brought up to another 3D object 2 so that they collide, this can be tested for using standard 3D vector and matrix geometry, and feedback adjustments can then be made to the locations inside the 3D environment of those 3D objects 2.

As soon as two 3D objects 2 are touching, they initially attract each other, but only up to the point of their centres being 2×radius×cos (60 degrees) apart from each other. If two 3D objects 2 are forced together so that their centres are closer than 2×radius×cos (60 degrees) the rules applied by the game loop pushes them apart instead of together. That is, the 3D objects 2 always tend towards a centre-separation-distance of 2×radius×cos (60 degrees). This behaviour is achieved by iteratively moving each 3D object 2 closer to, or further away from any of the 3D objects 2 it is touching, depending on whether it is closer than 2×radius×cos (60 degrees) or not. However it is typically only moved by part of the total deficit in any given iteration of the game loop. Consequently it takes several display frames for the distance between any given pair of 3D objects 2 to be moved to the target separation distance.

As, on each iteration of the game loop, each 3D object 2 is only moved a little at a time in the direction of the target separation, and this same iterative process is being applied to all pairs of touching 3D objects 2, this iterative process causes the 3D objects 2 to reposition themselves naturally and organically into arrangements such as hexagonal lattices which if being done by a non-iterative method would be very hard to program. This achieves Aemergent behaviour@ by applying very simple rules repeatedly over time and across multiple 3D objects 2.

The consequence of this emergent behaviour is that the 3D objects naturally tend to form hexagonal lattices, but which are curved around whatever 3D surface they are on (e.g. the emergent hexagonal lattices curve around the surface of the sphere).

The present invention may be provided with a number of features which prevent excessive consumption of processing power. For example, if groups of touching 3D objects 2 do not manage to settle themselves into a hexagonal lattice type arrangement, after a set number of iterations, eventually the software gives up trying until the user does something to trigger a fresh attempt (such as a user adding a new 3D object 2 to the group, or removing a 3D object from the group). A typical number of iterations for any of these catches is between about 200 and 400 iterations. This gives the automatic positioning algorithms enough chance to often be successful in creating hexagonal lattice arrangements of 3D objects 2, but allows the software to give up and not waste CPU and GPU resources on trying to sort out a situation which is unsolvable without user intervention.

In addition, collision detection does not need to be applied on every display frame. For example, it may only be applied to 3D objects 2 that are being moved relative to other 3D objects 2 or groups of touching 3D objects 2.

Graphical Indicators on 3D Objects

With embodiments of the invention, graphical indicators such as graphics, colours, text are applied to 3D object 2 using a Atexture@. That is, a two dimensional texture is firstly prepared for the graphical indicator. For example, in the case of text, the text is firstly drawn onto the texture. The texture is applied or drawn onto the 3D object 2 using texture mapping.

Advantageously, with the above arrangement, the application of texture mapping is processed using the computer devices graphics processing unit (GPU) and, preferably the GUI=s texture mapping unit (TMU). As a consequence, the application of graphical indicators to the 3D objects is achieved through efficient graphical processing as part of the graphics pipeline.

User Controlled Movement of 3D Objects

To move objects 2 and groups of objects about the 3D frame 1, they are selected with the cursor 3 and dragged from one position on the 3D frame 1 to another.

In this embodiment, the GUI is programmed to implement Aperfect dragging@ of the 3D frame 1 and the 3D objects 2 (see FIGS. 8(a) and (b)). With perfect dragging, the point on the frame 1 or 3D object 2 being dragged by the user remains exactly under the cursor 3 throughout the dragging operation, even though the objects 2 in 3D space may be moving towards the user or away from the user.

AArcball@ is standard way in which the orientation of the frame 1 or 3D object 2 can be changed by dragging with a cursor 3. However, standard implementations of Arcball do not ensure a perfect mapping between the pointer and the point that is being dragged. In these standard implementations of Arcball, although during the process of such a dragging operation the frame 1 may move reasonably as expected according to the movement of the pointing device, there may be more or less discrepancy involved between the point on the object that was clicked on when the dragging operation began, and the point that stays under the pointer during the dragging operation and when the pointing device is released. This embodiment uses an algorithm that the orientation of the 3D frame 1 to be precisely changed so that the point on the 3D object 2 where the cursor 3 initially is engaged at the beginning of a drag operation is kept precisely aligned throughout the dragging operation. This provides the user with much greater control over what orientation the 3D frame 1 is in. This 3D dragging spatial algorithm is specified in FIG. 9. The same algorithm is used for moving both the frame 1 and the 3D objects 2 around on that frame 1.

To avoid the users having to make several click and drag operations in order to drag objects 2 round to the other side of the 3D frame 1, as the user drags an object 2 towards the horizon 5, the frame 1 spins backward in the opposite direction (see FIG. 10). The further over the horizon 5 the user moves the cursor 3, the faster the frame 1 rotates back in the other direction. This allows 3D objects 2 to be moved to any point on the frame 1 in a single operation.

Object Orientation

To ensure that graphical indicators assigned to objects 2 on the frame 1 appear the correct way up, the GUI may implement a mathematical algorithm which keeps text and graphics upright from the point of view of the user, regardless of the current orientation of the frame 1. This algorithm can also be applied throughout any dragging operation in which the 3D objects 2 are moved around the frame 1. The orientation correction does not need to be done at every display frame, but rather only when the 3D frame 1 is rotated or when an object 2 is moved on the frame 1.

In preferred embodiments, the present invention utilises a mode in which the 3D objects 2 themselves lie flat above the surface of the frame 1. As such, the axis line of the 3D object 2, which passes through the apex of the cone and down through the middle of the circle at the base of the cone, is always kept pointing along the mathematical Anormal@ to the surface of the 3D frame 1 over which the 3D object 2 is hovering. The mathematical normal is a vector that points in the direction which is perpendicular to the tangential plane at that point on the 3D surface (see FIG. 5(a)).

Although in this mode, 3D objects 2 may be tilted away from the user in the forwards-backwards dimension relative to the user, they stay oriented upright in the up-down dimension relative to the user by rotating about there own axis to maintain the correct orientation (see FIGS. 11(a) and (b)). Graphics are kept upright in this way by passing a vector that points to current upright direction to the graphics processor along with a vector that points to the original upright direction of the graphic. The graphics processor then calculates the angular difference between these two vectors as if they were super-imposed on each other and rotates the graphic with the necessary amount to correct any discrepancy. The processing of this is preferably performed by the graphics processing unit (GPU) as this will usually provide a better frame rate than performing the same operation using a central processing unit (CPU).

3D Object Grouping

FIG. 13 shows automatic 3D object group identification and group boundary production which may be implemented in the present invention.

When 3D objects 2 are brought up next to each other so that they touch, the software detects this and conceptually allocates all continually touching 3D objects 2 into a group. As such, all 3D objects 2 within a group are connected together by touching at least one other member of the same group. To more clearly identify groups on the display, the area surrounding the group is highlighted with a group boundary 6.

Groups of 3D objects 2 repel each other. As such, when one group is dragged by its highlighted area into the vicinity of other groups, these are repelled away from it. This applies a similar iterative method to the automatic spacing algorithm described above. This time instead of touching 3D objects 2 being moved to a standard spatial separation of 2×radius× cos (60 degrees), the following procedure is applied:

1. When groups of 3D objects 2 are established, each group is taken one at a time and an attempt is made to include them into larger regions called (3D object) group boundary circles (GBC). A GBC is a circular space whose area covers a subset of all the 3D objects 2 included in a given group. An algorithm is used to attempt to cover the territory covered by the 3D objects 2 in the group with as few GBCs as possible.
2. Once a location of a GBC has been chosen, all the 3D objects 2 included by it are ticked off, so that any given 3D object 2 only needs to be covered by one GBC (see FIG. 14). The GBCs determine the highlighted area 6 around a group.
3. The Agroup repulsion algorithm@ takes any pair of GBCs from groups which are not the same group and moves all the 3D objects 2 within those groups away from each other in opposite directions which lie along the line between the centres of either of the groups or the GBCs (See FIG. 15).

Having identified a particular group of 3D objects 2 as belonging to the same group, when a group of 3D objects 2 is dragged by its highlighted region 6 instead of by the 3D objects 2 themselves, the collision detection between objects is suppressed for that dragging operation. This is achieved in programming code using a conditional clause such as the c#_if ( )_or _switch ( )_structures. This can, for example, optionally allow a group of 3D objects 2 to be dragged through another group without 3D objects 2 within the groups being affected.

When 3D objects 2 themselves are dragged by clicking down on the 3D objects 2 themselves, rather than on the GBC highlighted areas 6 around those 3D objects 2, the 3D objects 2 do not repel other 3D objects 2, and so the regular 3D object 2 attraction behaviour described above is exhibited.

When 3D objects 2 within a group are dragged away from the other 3D objects 2 in the group, they will separate from their existing group, but only if they are dragged away quickly enough. If they are dragged fairly slowly, the automatic attraction between touching 3D objects 2 above will act to keep the 3D objects 2 together in the same group, even though some of the group are being dragged by the user using a pointing device, and some are being kept together with those automatically by the software as it detects using the Aautomatic spacing algorithm@ that touching 3D objects 2 are further from them than they should be.

As such, a further consequence of the automatic spacing algorithm is that 3D objects 2 must be dragged quickly (Ayanked@), in a way that resembles separating sticky real world objects, in order to be separated from each other. This is a further example of a useful behaviour arising from the automatic spacing algorithm being an iterative process.

Group Naming

Text can be added to give a name to a group of 3D objects 2. The software stores a record of these groupings and any assigned names in a memory. If a grouping is split and then joined again at a later stage, the name that was most recently given to that group is recovered by default, however a keyboard combination allows the user to cycle through all the group names that have previously been given to that group of groups with a similar membership list. Whenever group membership is changed by a user, the software checks the list of groups that have existed in the past to see if any of the newly established groups have existed before and were previously given a name. If a group did previously exist with a given name, the name is by default re-applied to that group.

When a group is split, by default the group text stays with the side of the split which has the largest number of 3D objects 2 on its side. A key combination can, as in the cases above, apply the group's name text to the smaller group as well, if that is desired.

When a user zooms in on a particular group of 3D objects 2, the group text can optionally become gradually more transparent the closer the user gets to the group so that the individual objects 2 are not obscured by the text of the group. This is achieved by setting the group=s display text=s colour=s alpha value according to how close the user=s view (virtual camera inside the imaginary 3D space) is to the 3D object group in question.

Automatic Group Distribution

The GUI may provide a selectable command which allows a user to automatically distribute groups of 3D objects around the frame 1. When this mode is selected, the groups may be moved to an equidistant position from each other, spread symmetrically and evenly around the frame 1. For example, if there are four groups on the frame 1, they would move so that they are each centred on points of tetrahedron (whose points all lie on the frame).

Editing Text Assigned to a 3D Objects

As shown in FIG. 16, when entering text into a 3D object 2, the 3D object may be automatically raised up off the 3D frame 1 and brought to front and centre to allow the user to enter text. A medium level of transparency is applied to the 3D object 2 being edited so as to allow a user to see the other objects in the vicinity that it came from, but which masks text from them that could otherwise be distracting. This makes it easier for a user to focus on the particular 3D object 2 they are typing into.

The above is achieved in the software by having properties of 3D objects 2 including a state value to indicate: I) Whether it is currently being edited, and ii) Whether it is currently rising up off the 3D frame 1 to start a text-editing operation or is currently being edited or is currently falling back down on to the sphere having just undergone a text-editing operation.

Categorisation of the 3D Objects

In this embodiment, 3D objects 2 can be assigned a category which is stored in memory. Each category can then have a colour, image, or shape assigned to it, which can be visualised within the 3D environment as a graphical indicator applied to the 3D object 2. For example, FIG. 25 shows 3D objects which have a A?@ symbol assigned to them. In this way, by assigning graphical indicators the process of categorising data items, rather than applying the indicators directly to the objects themselves, the indicators associated with any given category can be easily changed for all data items in that category.

Once 3D objects 2 have been allocated with categories within a categorization, 3D objects 2 can be automatically spatially grouped according to that categorisation. This is described in FIG. 17. All the 3D objects 2 that belong to a given category may be brought together in one place on the surface on which they are situated. At this stage, both the Aautomatic spacing algorithm@ and the Agroup repulsion algorithm@ discussed above are applied simultaneously. The automatic spacing algorithm has the effect of spreading out the 3D objects 2 into a hexagonal lattice. The group repulsion algorithm has the effect of ensuring that as groups expand under the effect of the automatic spacing algorithm such that they do not merge and coagulate into neighbouring groups. The combined effect of applying both of these algorithms simultaneously is then that having moved all of the 3D objects 2 in a given category to a particular location on the surface, those 3D objects 2 spread out around that point and push neighbouring groups away as they do so, thereby achieving a separate group for each category which is neither too far nor too near to other categories on the surface and where all the 3D objects 2 within the group can be seen in something approximating to a hexagonal lattice just as they do when being dragged around by a user. As both of the algorithms are iterative processes that move each 3D object 2 just a little at a time in the direction of its final location, the emergent behaviour of these iterative algorithms gives rise to useful spatial arrangements of 3D objects 2 inside 3D environment which would be vastly more complicated to achieve and to program if iterative methods were not being used.

A 3D object 2 may be allocated to more than one category. In the case of category membership being represented by colour, the 3D object 2 is divided into Apie pieces@ each of which has a proportion of the whole 360 degrees according to how many categories have been applied to that 3D object 2 split equally amongst all those categories. In this case when automatic spatial grouping by a given categorisation is applied, 3D object 2 that belong to multiple categories are initially put into a separate group. In other words a combination of categories is treated as though it is simply an additional category.

Context Storage

The GUI may also be programmed to store alternative spatial arrangements of objects 2, so-called Acontexts@. This allows a user to switch between alternative arrangements of 3D objects 2. This movement of objects 2 can be effected on screen, to thereby allow a user to visualise how the positioning and grouping of objects changes between different scenarios. This is described in FIG. 18.

As part of the above, an in-memory list may also be stored of all previous group memberships of the 3D objects 2, along with the names given to those groups. This allows such groupings to be optionally re-applied.

Links Between 3D Objects

Lines 7 of varying thickness may be dragged out between 3D objects 2 which are currently not touching each other (see FIG. 19). The thickness of the line 7 is controlled by dragging the side of the line once it has been created. Lines 7 between 3D objects 2 may be used to represent relationships between 3D objects 2. Within the 3D environment, the lines 7 may be formed as tubes which attach to the 3D objects 2.

Hierarchy Tree View

Figure 20A:
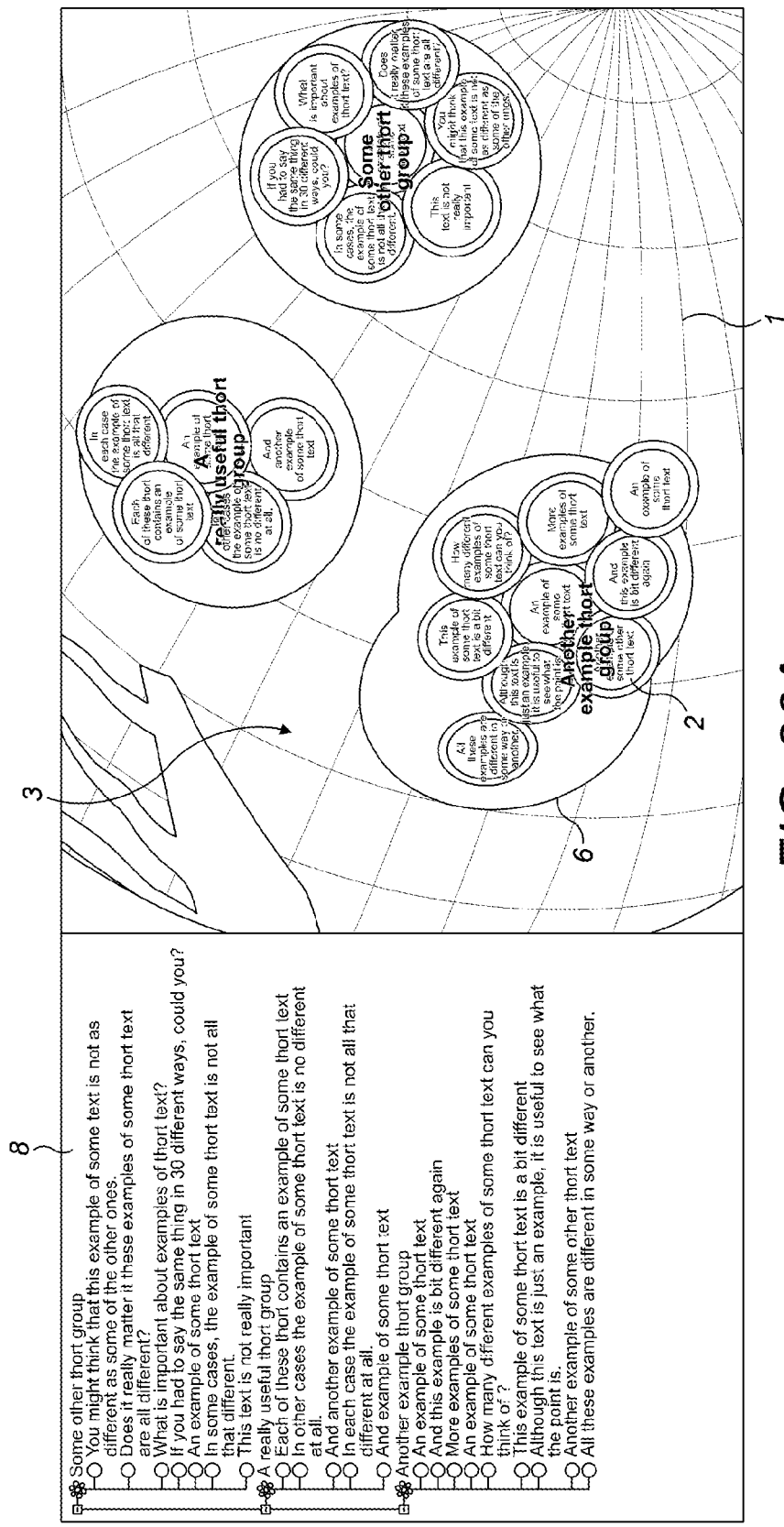
Figure 20B:
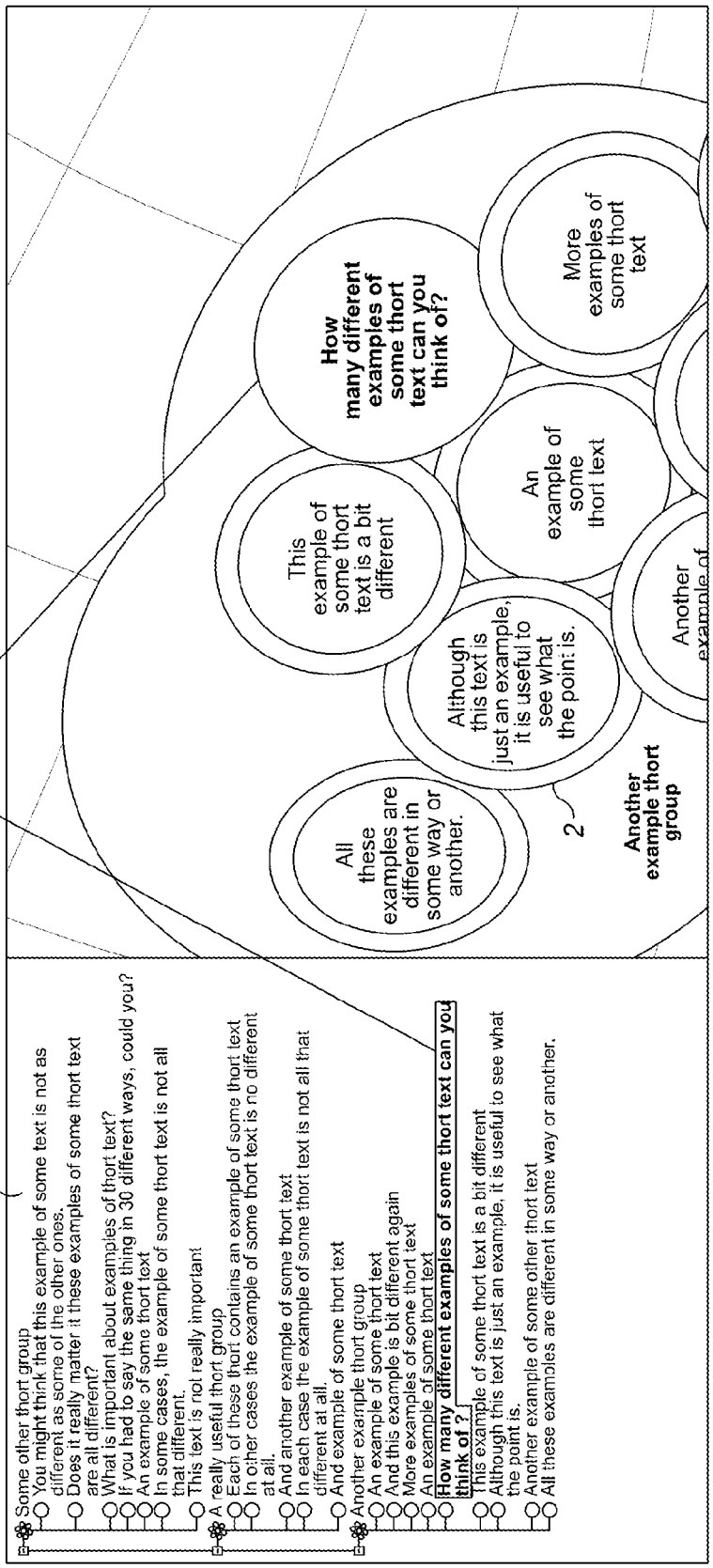

To support the user in having a clear understanding of the groupings of 3D objects 2 on a given frame 1, a Atree view@ or a regular Aspider diagram@ hierarchy 8 may be provided which is kept automatically synchronised with the way the user has grouped their 3D objects 2 on the 3D frame 1 (see FIG. 20(a)).

To implement this, all 3D objects 2 that are grouped together by touching on the 3D frame 1 are allocated to the same parent under the hierarchy 8. When a user puts their cursor 3 over any given 3D object 2 on the frame 1, the corresponding item on the hierarchy 8 is automatically selected and given focus within the hierarchy 8. When a user selects any given item on the hierarchy 8, the 3D object 2 corresponding to that item is brought to front and centre on the 3D frame 1 by rotating it (see FIG. 20(b)).

Optionally, the names and order of 3D objects 2 and groups may be edited in the hierarchy 8. In addition, 3D objects 2 could also, optionally, be moved between different groups or be separated into new groups using the hierarchy 8, which causes the relevant 3D objects to move on the 3D frame. New 3D objects 2 could also be added in the same way.

A search box may be provided at the top of the hierarchy 8 to make it easy to locate any given 3D object 2 item based on the indicator assigned to it (e.g. text), allowing a user to find the item within the hierarchy 8, and hence also find its 3D object 2 on the 3D frame 1.

All Groups Face User

Figure 21B:
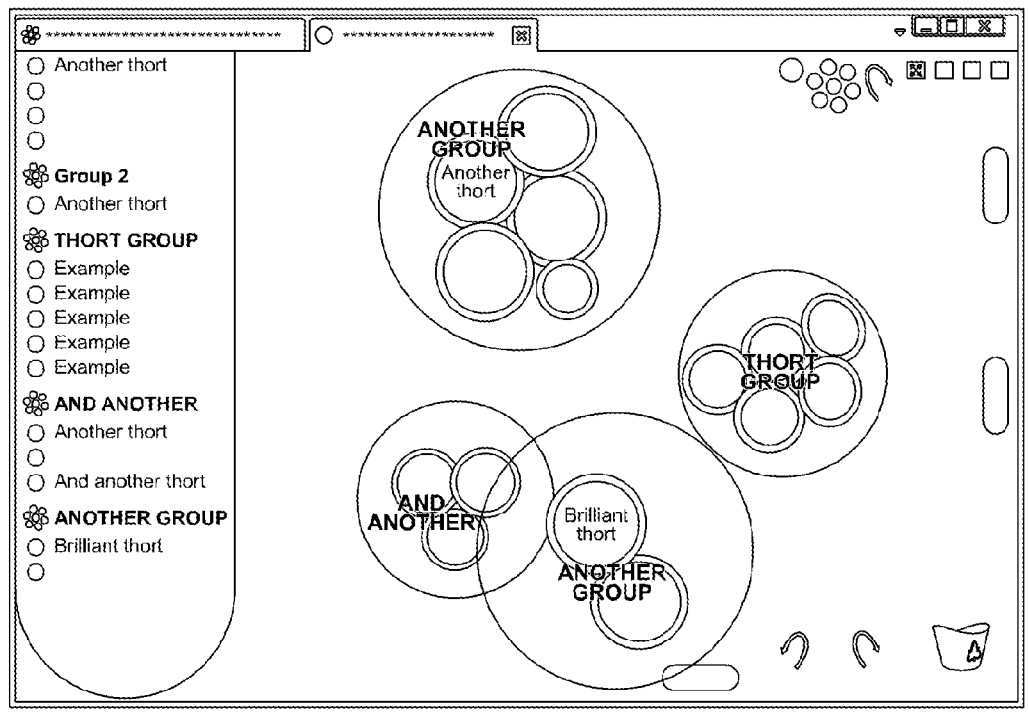

The GUI may allow a user to optionally select for all 3D objects 2 or a group of 3D objects 2 to turn to face the user regardless of their orientation on the sphere. This may be useful for providing a user with an overview of all the groups and is particularly helpful for groups that are currently situated on the horizon 5 of the frame 1 since the user would normally only have Aside@ on view of these objects. This mode could be applied when the frame 1 is dragged or the mouse is over the hierarchy 8, for example. FIGS. 21 (a) and (b) show before and after views of this mode. As will be understood, in FIG. 21(b), a billboard mode is applied to the 3D objects 2.

It will also be understood that in other embodiments, this operation can occur automatically. For example, all groups of 3D objects 2 could automatically turn to face the user, but lie flat against the 3D frame when 3D objects are being dragged.

Sound Effects

Sound effects may be applied at appropriate events. Sound effects are used to provide feedback to the user regarding the actions they are taking. For example, bubbling sounds may be used when 3D objects 2 join with other 3D objects 2 in groups, or are split apart from other 3D objects 2.

Alternative Embodiments

FIGS. 22 and 23 shows another GUI embodiment which can be used to visualise the relative importance to a user of different attributes or qualities. For instance, in this illustrative example, the GUI may be used to rank the relative importance of different philanthropic attributes or charitable areas, each of which is associated to a particular 3D object 2 and identified by a text and/or colour assigned to that 3D object 2.

In the GUI, the frame 1 is again provided as a sphere, with the 3D objects 2 being provided as smaller spheres which are positioned on the surface of the frame. The frame 1 may again be rotated in the 3D environment as described above. The 3D objects 2 are provided at predetermined positions on the 3D frame 1 but, in this embodiment, may be increased or decreased in size using input menu 9.

In this connection, the input menu 9 contains a number of slider bars, each of which corresponds to one of the 3D objects 2 on the frame 1. Initially, all objects 2 are provided having the same size. As the slider for each 3D object 2 is adjusted, its size increases or decreases relative to the other 3D objects 2. That is, the total volume of all of the 3D object spheres remains constant, so as one object is increased in size, the other objects are reduced. This allows a user rank the relative importance of the attributes assigned to the 3D objects 2 using the slider bars and then see a visualisation of this in the 3D environment.

As shown in FIG. 23, as the user adjusts the importance of different attributes, the GUI is able to provide connector bars 7 between the 3D objects 2. The connector bars 7 connect from the largest sphere to the second largest, and so on. This allows a user to see a string or chain of 3D objects 2 which shows the relative order of importance of the different attributes assigned to them. At the same time, the 3D environment also allows the user to simultaneously visualise attributes which they consider of less importance. As a consequence, this GUI is useful for helping a user to assess their priorities and visualise this in an clear and easy to understand manner.

FIG. 24 shows another GUI embodiment where a plurality of linked 3D frames are provided, each with their own plurality of 3D objects 2 assigned to them. In FIG. 24, the 3D frame 1 shows the "current main" 3D frame sphere, with the connected "linked" 3D frame spheres 10 around it. These linked spheres are displayed as scaled down sub-frames 10, which can be interacted with in a similar fashion to the 3D objects 2. The scaling makes it easier to show a larger number of linked 3D frames around the "current main" 3D frame. When a user selects to focus in on one of the linked 3D frames it switches to become the new "current main" 3D frame and moves to the centre and increases in size to it's normal scaling. The previous main 3D frame then becomes one of the linked sub-frames 10 around the new current main 3D frame 1. In this way, a user can navigate easily around an entire web or network of 3D frames, and 3D objects 2 or groups of 3D objects 2 may be dragged and dropped between different linked 3D frames and sub-frames. Different users could also link their 3D frames together.

As with other 3D objects 2 in the previous embodiments, sub-frames 10 are moveably locatable at positions relative to the main 3D frame 1 and can therefore be dragged and dropped into different positions. Once pinned to a location on the 3D frame 1, the sub-frames 10 can be rotated with it, within the 3D environment. Connector bars 7 may also be defined to link between different sub-frames 10 and link sub-frames to the main 3D frame. These connector bars 7 can, for example, be assigned with text labels which describe the relationships between the linked objects. They may also have variable thicknesses, which could be used to represent the strength of the relationship and consequently dragging any such objects will have a more or less "elastic" pull on any linked objects. For example, a "yanking" mouse gesture could be used to extricate a sub-frame 10 from a connector bar 7. The formation of connector bars 7 may require an explicit process from the user, such as dragging a link from one sub-frame 10 to another, or may be automated so that they are created when a sub-frame 10 is moved into the vicinity of another sub-frame.

Similar to previous embodiments, the linked sub-frames 10 around the current main 3D frame 1 can self-organise their locations, with the target distance between any pair of sub-frames 10 being dependent upon their radius. For example, the sub-frames 10 may be configured to move to a distance which is 1.5 times the sum of the two radii of the two sub-frames 10 that are involved in the link.

As will be understood, the present invention provides a user interface which makes use of modern computer processing capabilities, and particularly graphics processing units. This allows for a visually intuitive GUI environment to be provided which allows a user to visualise and interact with complex arrangements of data and applications. At the same time, by capitalising on the efficient processing of standard geometric shapes using modern GPU arrangements, CPU overhead and memory requirements are minimised. In other words, the present invention capitalises on processing capabilities originally intended for 3D gaming, and not typically used in conventional GUIs, and uses this to enhance the GUI user experience, as compared to conventional 2D GUIs.

The 3D environment provided by the GUI of the present invention is very simple and intuitive to use. Furthermore, as the frame can be rotated in order to bring any 3D object, and hence any data item associated with that object, into view, no 3D object on the frame necessarily needs to be assigned with a higher level of status. For example, all points on a spherical frame have equal status. This contrasts with a two dimensional GUIs, where items appear ranked or where items in the middle of the screen may seem to have a greater importance than things at the edges.

Furthermore, as any 3D object can be brought to front and centre by rotating the frame, and consequently brought so as to have the focus of attention, and the most closely related data items to any given item can be displayed around that item. This allows data items related to a 3D object data item currently being worked on to be easily identified.

Moreover, when a user is viewing or working on a particular 3D object data item, they are also able to either view or locate any other data item on the frame. This enables users to switch quickly between different content or data items.

The surface of the frame also provides a relatively larger surface area compared to the surface area of a two dimensional desktop. Moreover, the frame can also easily be made larger or smaller so as to allow a user to determine for themselves a balance between being able to see the whole of a surface at a given magnification, and having a surface which can locate more data items.

As discussed above, a feature of the present invention is that despite its ability to display complex arrangements of 3D objects, by using basic 3D shapes and relying on the GPU to render these, the definition of the 3D environment requires very small amounts of data. This provides for a very compact GUI program file. This is particularly advantageous for cloud computing and distributed working environments. For example, the 3D objects may provide links to data items such as web pages or other files sorted on distributed servers. The GUI file can therefore be sent to a number of users, each of whom can open the 3D environment, with the data items arranged and accessible to each users in the same way as the source. The present invention can therefore be used to provide a very memory efficient way to present and distribute arrangements of data, thereby facilitating distribution by email or other electronic means.

In this connection, in an embodiment the GUI could, for example, be used as a presentation or teaching tool, with data items or slides concerned with related topics having their respective 3D objects clustered together on the frame. A presenter could thereby identify related slides, but also switch quickly between different slides associated with different topics.

Embodiments of the GUI could also be used as brainstorming tools. In this way, each 3D object may be associated with an idea designated by an associated graphical indicator. Related items/objects can then be grouped together and different groupings can be visualised by switching between different contexts.

In this connection, the above features also allow the present invention to be used for online conference working, where multiple users can interact with or edit the 3D objects on the 3D frame in real time. Advantageously, the GUI would allow different users to work on different areas of the 3D frame, whilst still allowing them to see the changes being made in other areas. Moreover, the relatively small amount of data required to express changes in position of the 3D objects also allows this type of multi-user interaction to be implemented with relatively minimal bandwidth requirements.

It will also be understood that the specific algorithms used for the automatic 3D object spacing and automatic group spacing can be modified depending on the requirements of the specific embodiments. For example, the group spacing algorithm may be modified such that groups are spaced 1.1×radius of the first group=s boundary circle for two 3D objects together, and spaced 1.6×radius of the first group=s boundary circle for a single 3D object with a multi-object group.

Furthermore, additional algorithms for additional functions may also be provided. For example, a "regrouping" algorithm may be provided for re-uniting members of a group which have become spatially separated on the surface of the 3D frame. FIG. 26 shows this operation where a separated part of a group is brought together so that it is touching again, while at the same time maintaining as much of the existing layout of as possible. As shown, on the right hand side of FIG. 26, the numbered 3D objects (1, 2 and 3) are removed from the group above. The remaining 3D objects automatically move together so that they are touching and therefore stay in the same group. While this happens, however, the structure of the two halves of the group that are coming together is maintained as much as possible. The two sub-groups are therefore simply moved together so that they touch on to each other at the point which is nearest, and hence the least distance for the groups to travel towards each other.

Other features may also be provided. For example, as a user zooms out from the 3D frame, it can become more difficult to read text assigned to each 3D object. A solution to this would be to implement keyword identification and text enlargement on zoom out. Keywords could be identified from a dictionary. As the user zooms out, words that are not keywords will be temporarily hidden, whilst the keywords will be displayed using a larger font. The size of each keyword could also be varied according to an importance algorithm (e.g. how often the word is used or the inverse of how often it is used).

Moreover, Afollow camera@ functionality may also be applied when a user drags 3D objects. For example, after an initial delay, the rotational camera that moves around the current main 3D frame may follow an object being dragged. This has the result that the user has both the experience of complete control with accurately positioning 3D objects, but also the convenience that where ever over the surface of the 3D frame they drag 3D objects to, the camera will follow them.

The invention claimed is:

1. A non-transitory computer-readable medium encoded with a computer program for providing a user interface for a computing device, the interface comprising:
   means for defining a coordinate system of a 3D frame, the 3D frame being rotatable within a 3D environment of the user interface;
   a plurality of 3D elements each formed from a plurality of 3D components, the plurality of 3D elements comprising a graphical indicator for identifying the plurality of 3D elements, each 3D element of the plurality of 3D elements being moveably locatable relative to the coordinate system when un-fixed and being fixably locatable at a position relative to the coordinate system, wherein fixed 3D elements can automatically rotate with respect to the 3D frame when the 3D frame is moved within the 3D environment so that their graphical indicators remain upright from the point of view of a user; and
   means for automatically designating two or more of the plurality of 3D elements as a selectable group when the two or more 3D elements are located within a predetermined distance of each other and applying an automatic object spacing algorithm to the two or more 3D elements in the group for applying iterative distancing rules for controlling the spacing of 3D elements within the group.

2. A non-transitory computer-readable medium according to claim 1, wherein the coordinate system is defined by an origin of the 3D frame.

3. A non-transitory computer-readable medium according to claim 1, further comprising means for displaying a surface of the 3D frame, the plurality of 3D elements being locatable on or relative to a position on the 3D frame surface based on the coordinate system.

4. A non-transitory computer-readable medium according to claim 1, wherein each of the plurality of 3D elements is an icon or a data placeholder.

5. A non-transitory computer-readable medium according to claim 1, wherein the plurality of 3D elements comprises a sphere or a cone.

6. A non-transitory computer-readable medium according to claim 5, wherein the cone has a circular base.

7. A non-transitory computer-readable medium according to claim 5, wherein the cone has a height and a radius, and the cone's height to radius ratio is between 1:15 and 1:30.

8. A non-transitory computer-readable medium according to claim 6, wherein the circular base of the cone faces towards the origin of the 3D frame.

9. A non-transitory computer-readable medium according to claim 1, wherein the 3D frame is a sphere.

10. A non-transitory computer-readable medium according to claim 3, wherein the 3D frame surface has variable transparency.

11. A non-transitory computer-readable medium according to claim 1, wherein the automatic object spacing algorithm is disabled after attempting to space two or more 3D elements for more than a predetermined number of iterations.

12. A non-transitory computer-readable medium according to claim 1, wherein the interface further comprises means for applying an automatic group spacing algorithm for controlling the spacing of groups of 3D elements which are within a predetermined distance of each other.

13. A non-transitory computer-readable medium according to claim 1, wherein the interface further comprises user control means for allowing a user to adjust the size of at least one of the plurality of 3D elements.

14. A non-transitory computer-readable medium according to claim 1, wherein the interface further comprises linking elements for visually linking between 3D elements.

15. A non-transitory computer-readable medium according to claim 1, wherein the graphical indicator of each 3D element is applied to its surface as a texture.

16. A non-transitory computer-readable medium according to claim 1, wherein the computer program further comprises instructions for storing in a memory the locations of the 3D elements relative to the coordinate system at intervals in time.

17. A computing device comprising:
a non-transitory computer-readable medium encoded with a computer program comprising instructions for defining a coordinate system of a 3D frame and a plurality of 3D elements each formed from a plurality of 3D components, the 3D frame being rotatable within a 3D environment of the user interface, and the plurality of 3D elements comprising a graphical indicator for identifying the plurality of 3D elements, each 3D element of the plurality of 3D elements being moveably locatable relative to the coordinate system when un-fixed and being fixably locatable at a position relative to the coordinate system, wherein fixed 3D elements can automatically rotate with respect to the 3D frame when the 3D frame is moved within the environment so that their graphical indicators remain upright from the point of view of a user, and the computer program further comprising instructions for automatically designating two or more of the plurality of 3D elements as a selectable group when the two or more 3D elements are located within a predetermined distance of each other and applying an automatic object spacing algorithm to the two or more 3D elements in the group for applying iterative distancing rules for controlling the spacing of 3D elements within the group; and
a graphics processing unit for rendering the 3D environment and the plurality of 3D elements for display on a display screen based on the instructions of the computer program.

18. A non-transitory computer-readable medium encoded with a computer program for providing a user interface, the computer program comprising:
instructions for defining a coordinate system of a 3D frame, the 3D frame being rotatable within a 3D environment of the user interface;
instructions for defining a plurality of 3D elements each formed from a plurality of 3D components, comprising a graphical indicator for identifying the plurality of 3D elements, each 3D element of the plurality of 3D elements being moveably locatable relative to the coordinate system when un-fixed and being fixably locatable at a position relative to the coordinate system, wherein fixed 3D elements can automatically rotate with respect to the 3D frame when the 3D frame is moved within the 3D environment so that their graphical indicators remain upright from the point of view of a user; and
instructions for automatically designating two or more of the plurality of 3D elements as a selectable group when the two or more 3D elements are located within a predetermined distance of each other and applying an automatic object spacing algorithm to the two or more 3D elements in the group for applying iterative distancing rules for controlling the spacing of 3D elements within the group.

19. A non-transitory computer-readable medium according to claim 1, wherein each 3D element of the plurality of 3D elements is moveably locatable by a dragging operation.

20. A computing device according to claim 17, further comprising means for displaying a surface of the 3D frame, the plurality of 3D elements being locatable on or relative to a position on the 3D frame surface based on the coordinate system.

21. A non-transitory computer-readable medium according to claim 18, further comprising means for displaying a surface of the 3D frame, the plurality of 3D elements being locatable on or relative to a position on the 3D frame surface based on the coordinate system.

* * * * *